United States Patent [19]
Ikeda et al.

[11] Patent Number: 6,058,208
[45] Date of Patent: *May 2, 2000

[54] COLOR CORRECTION DEVICE AND COLOR CORRECTION METHOD

[75] Inventors: Jun Ikeda, Fukuoka; Tsuyoshi Hirashima, Iizuka; Tadanori Tezuka, Honamimachi; Hitoshi Fujimoto, Fukuoka; Yuji Shimizu, Koga-machi, all of Japan

[73] Assignee: Matsushita Electric Industrial Co., Ltd., Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/547,594

[22] Filed: Oct. 24, 1995

[30] Foreign Application Priority Data

Oct. 26, 1994 [JP] Japan ................................ 6-262350
Feb. 17, 1995 [JP] Japan ................................ 7-029416
Oct. 20, 1995 [JP] Japan ................................ 7-272743

[51] Int. Cl.⁷ ........................................................ G06K 9/00
[52] U.S. Cl. ............................ 382/167; 358/518; 345/431
[58] Field of Search ..................... 382/167, 117, 382/162; 345/431; 358/518, 520, 523; 356/405, 520; 711/113

[56] References Cited

U.S. PATENT DOCUMENTS

| | | | |
|---|---|---|---|
| 4,328,515 | 5/1982 | Wellendorf | 358/523 |
| 4,488,245 | 12/1984 | Dalke et al. | 356/405 |
| 4,875,155 | 10/1989 | Iskiyan et al. | 711/113 |
| 5,130,789 | 7/1992 | Dobbs et al. | |
| 5,333,070 | 7/1994 | Ichikawa | 358/518 |
| 5,506,946 | 4/1996 | Bar et al. | 345/431 |

FOREIGN PATENT DOCUMENTS 3127284  5/1991  Japan .
5300531 11/1993  Japan .
 669225  8/1994  Japan .

OTHER PUBLICATIONS

"Adobe Photoshop," pp. 113–120, Feb. 15, 1994 (translation).

Fast Color Processor with programmable interpolation by small memory (Prism), Katsuhiro et al Journal of Electronic Imaging, vol. 2(3), p. 213–224, Jul. 1993.

Computer Dictionary, Microsoft Press JoAnne Woodcock et al, 1993.

*Primary Examiner*—Amelia Au
*Assistant Examiner*—Samir Ahmed
*Attorney, Agent, or Firm*—Price, Gess & Ubell

[57] ABSTRACT

A color correction device for correcting colors in a color image, comprising: standard point registration means for registering coordinates of a standard point on a color space for at least one color to be used as a standard for color correction; object point registration means for registering coordinates of an object point on the color space which corresponds to a standard point and which is a desired color after color correction; and coordinate conversion means for determining a mapping function based on the standard point and the object point, and for generating a corrected color image by using the mapping function to convert pre-correction points on the color space which are equivalent to a color of each pixel in an inputted pre-correction image. By means of the construction described above, all of the colors in a color space can be converted based on at least one pair of standard point and object point. As a result, precise color correction can be easily achieved.

32 Claims, 29 Drawing Sheets

L*C*uv H°uv COORDINATE SYSTEM

COLOR CORRECTION DEVICE AND COLOR CORRECTION METHOD

BACKGROUND OF THE INVENTION

1. Field of the Invention

The present invention relates to a color correction device and color correction method for correcting the colors in an inputted image and outputting a corrected image.

2. Description of the Prior Art

There is already a well-known technique for correcting colors in an image as a whole, wherein an experienced user visually compares the colors in an original image and those in a corrected image and then adjusts the parameters for color correction, such as gain, gamma, or hue, in a color space, such as a red.green.blue (RGB) color space or a lightness.chroma.hue (LCH) color space.

Another example of a conventional color correction technique is that used by the color correction device taught by Japanese Laid-Open Patent Application No. 5-300531, the construction of which is shown in FIG. 1. As can be seen in the drawing, the color correction device in the aforementioned reference is comprised of a color monitor 101, a touch panel 102, a color corrector 103, a playback VTR 104, a recording VTR 105, an editing unit 106, an original image 107 and a reference image 108. For the color correction device constructed as described above, the original image 107 inputted from the playback VTR 104 is first displayed along with the reference image 108 on the color monitor 101. Next, the user uses the touch panel 102 to indicate a specifying indication color in the reference image 108 and a specifying indication color in the original image 107. Following this, the color corrector 103 refers to the indicated specifying indication colors and executes color correction of the color in the original image which belongs to an area which is limited in three-dimensions in the color space.

However, since the former of these conventional color correction methods relies on the experience and intuition of the user, this means that the quality of the work which can be achieved by such method will depend on the ability of the user. A further problem lies in that when correction of the specified color is performed, other colors in the image end up being affecting in a similar way.

For color correction using the latter of the two methods described above, it is necessary to set the correction area for each of the specified indication colors by trial and error, so that here, too, the quality of the work which can be achieved will depend on the skill of user. As a further problem, when the degree to which correction is performed for a correction area is great, there can be a sudden drop-off in the transition of color at the border between the corrected area and the non-corrected area, so that there can be the unnatural phenomenon of an outline (hereafter, "false outline") which is not present in the original image being seen at the border between such corrected and non-corrected areas.

SUMMARY OF THE INVENTION

It is a primary object of the present invention to provide a color correction device which can perform color correction of a color image which does not lead to the generation of false outlines and which can minimize undesired effects on colors which the user does not want corrected, thereby solving the aforementioned problems with conventional techniques.

It is a further object of the present invention to provide a color correction device which can quickly execute a desired color correction requiring only a simple user operation.

The above objects can be achieved by a color correction device for correcting colors in a color image, comprising: a standard point registration unit for registering coordinates in a color space of at least one standard point, the color space having axes for specifying colors and a standard point representing a color to be used as a standard for color correction; an object point registration unit for registering coordinates in the color space of an object point for each standard point, each object point representing a desired color to be achieved by color correction of a standard point; and a coordinate conversion unit for determining a mapping function which maps each standard point to a corresponding object point and which can be used for mapping any arbitrary point in the color space, and for generating a corrected color image from an inputted pre-correction image using the mapping function.

By means of this construction, every color in the color space is corrected using a mapping function based on all of the standard points and object points registered in the standard point registration unit and in the object point registration unit. That is to say, the color correction executed by the present invention is performed according to a same equation regardless of the number of pairs of standard point and object point. For this reason, all of the points in the color space can be corrected no matter how many colors the user wishes to correct, so that the user no longer needs to specify the area for color correction. In this way, color correction can be easily performed for any number of colors without depending on the experience of the user.

Here, the mapping function may be a function where an effect of a standard point on an amount which an arbitrary point in the pre-correction image is moved during mapping decreases as a distance in the color space from said pre-correction point to said standard point increases.

By means of the above construction, the effect of a standard color on pre-correction colors increases the closer such pre-correction colors are to said standard color. Also, by registering colors to be corrected and colors not to be corrected as standard points and object points registered in the standard point registration unit and in the object point registration unit, a desired color correction can be performed. In this way, undesired effects on colors not to be corrected can be avoided.

Also, the coordinate conversion unit may include: a standard movement amount calculation unit for calculating a standard movement amount for each standard point, said standard movement amount being a standard value used in determining an amount which a point in the pre-correction image is moved during mapping; a first weighting coefficient calculation unit for calculating a weighting coefficient which corresponds to a distance from a standard point to a pre-correction point, using a fixed weighting coefficient function which has the weighting coefficient decrease uniformly with said distance; a summing unit for summing products of a standard movement amount and the weighting coefficient, for every standard point; and a color image generation unit for adding a value calculated by the summing unit to the coordinates of the pre-correction point so as to generate a color in a corrected image.

By means of the above construction, the amount for correcting a pre-correction color decreases linearly with the distance between the pre-correction point and a standard point, with the effects due to every standard point then being linearly totalled. As a result, it is possible to have a pre-correction color image mapped smoothly in the color space, thereby avoiding the generation of false outlines.

Also, the standard movement amount calculation unit may include: a correction amount calculation unit for calculating a difference (hereinafter, correction amount) in the coordinates between a standard point and a corresponding object point, for every standard point; a distance calculation unit for calculating a distance between all possible combinations of two standard points, including combinations where there is duplication of a same standard point; a second weighting coefficient calculation unit for using the weighting coefficient function to calculate a weighting coefficient for each distance calculated by the distance calculation unit; an inverse matrix generation unit for generating an inverse matrix of a matrix, wherein weighting coefficients calculated by the second weighting coefficient calculation unit are elements in said matrix; and a matrix multiplication unit for multiplying the inverse matrix generated by the inverse matrix generation unit by the correction amounts and for setting multiplication results as the standard movement amount, wherein there is a plurality of standard points.

By means of the above construction, the mapping function for performing a desired color correction by mapping standard points to the object points can be found by means of a simple linear equation. By doing so, a color correction device which can quickly perform a desired color correction can be realized.

Here the mapping function may be a function which performs interpolation and extrapolation for any arbitrary point in the color space setting all of the standard points and object points as standards.

By means of the above construction, the post-correction points corresponding to all of the points in the color space are calculated beforehand using interpolation and extrapolation. As a result, it becomes no longer necessary to calculate post-correction points every time pre-correction points are indicated.

Also, the coordinate conversion unit may include: a distance determination unit for comparing a distance on the color space between two standard points with a fixed threshold value; and a calculation order determination unit for determining object points to be simultaneously used when executing interpolation and extrapolation, based on a comparison result for the distance determination unit.

By means of the above construction, it is possible to avoid unnatural color correction which can occur due to the proximity of a plurality of standard points in the color space.

Also, the coordinate conversion unit may include: a LUT storage unit for storing a look up table (hereinafter, LUT) made up corresponding sets of coordinates for a plurality of predetermined points in the color space and coordinates of points achieved by mapping said points using the mapping function; and a LUT reference unit for retrieving, once a pre-correction color image has been inputted, post-correction points corresponding to pre-correction points in the color image.

By means of the above construction, the post-correction points corresponding to certain points in the color space are stored beforehand as an LUT, so that once pre-correction points are indicated, the post-correction points can be obtained by merely referring to the LUT. As a result, a color correction device which can execute color correction at high speed can be realized.

Here the LUT reference unit may generate a corrected color image by retrieving a predetermined number of points in the LUT and executing an interpolation calculation between said points.

By means of the above construction, once a pre-correction point is indicated, an appropriate post-correction point can be determined out of the plurality of the points in the LUT. As a result, since only representative points for the color space are stored in the LUT, a color correction device with an LUT of reduced storage size can be achieved.

Also, the coordinate conversion unit may include: a temporary storage unit for storing coordinates obtained by conversion using the mapping function corresponded to points before conversion; a hit detection unit for detecting, once a pre-correction color image is inputted, whether pre-correction points in the pre-correction color image are being stored by the temporary storage unit; a temporary storage retrieval unit for retrieving, when the hit detection unit detects that the pre-correction points are being stored, converted points corresponding to the pre-conversion points from the temporary storage unit, thereby generating the corrected color image; and temporary storage writing unit for writing, when the hit detection unit detects that the pre-correction points are not being stored, points which are converted according to the mapping function and corresponding pre-conversion points into the temporary storage unit, as well as generating the points of the corrected color image from the points which are converted.

By means of the above construction, since it is unnecessary to use the mapping function when an indicated color is the same color as a point which has already been converted, a reduction can be made in the time taken for color correction.

Also, the coordinate conversion unit may further include: a temporary storage updating unit for detecting whether there is free space for storing in the temporary storage unit and, when a detection result is that there is no space for storing, for ensuring there is sufficient space for the temporary storage writing unit to write by deleting a content at an appropriate position in the temporary storage unit.

By means of the above construction, then even when there is no recording space for recording new information in the temporary storage unit, the temporary storage updating unit deletes certain coordinates which are already registered and records the new coordinates. By doing so, the problem of there being insufficient space in the temporary storage unit can be solved.

Also, the temporary storage unit may store coordinates of post-conversion points at blocks corresponded to coordinates of pre-conversion points, and the hit detection unit may detect whether a pre-conversion point is stored by the temporary storage unit using the blocks.

By means of the above construction, a number of blocks are formed in the temporary storage unit, with the coordinates being stored in the temporary storage unit in blocks corresponded to their values. By dividing, for example, the temporary storage unit into a number of blocks and distributing the coordinates between these blocks according to their values, a temporary storage unit whose processing is faster than that of a large temporary storage unit which treated as one block can be achieved.

Also, the color correction device may further include a correction standard indication unit for receiving an indication of any arbitrary point in the color space and for storing said point as the standard point in the standard point registration unit and as the object point in the object point registration unit.

By means of the above construction, any arbitrary point in the color space can be set as a standard color and an object color, so that it is very easy for the user to change the standards for color correction.

Also, the correction standard indication unit may include: a display unit; an input operation unit for receiving an indication from the user; and a display control unit for displaying an operation image on the display unit, for determining the standard point and the object point based on an indication received via the input operation unit, and for storing the standard point in the standard point registration unit and the object point in the object point registration unit.

By means of the above construction, a user can indicate the parameters for color correction using a graphical user interface, so that it is very easy for a user to have their desired color correction performed.

Also, the display control unit may include: an image display unit for displaying the pre-correction color image and the corrected color image on the display unit; and a storage unit for obtaining, when a pixel in the pre-correction color image is indicated by the input operation unit, coordinates of said pixel as the standard point and an object point, for obtaining, when a pixel in the corrected color image is indicated by the input operation unit, coordinates of said pixel as an object point, and coordinates of a pixel in a corresponding position in the pre-correction color image as the standard point, and for storing the standard point in the standard point registration unit and the object point in the object point registration unit.

By means of the above construction, the pre-correction color image and the post-correction color image are displayed on the display unit, so that the user can look at these images and easily set the parameters for color correction.

Also, the display control unit may includes a correction standard display unit for displaying every pairing of standard point and object point indicated by the input indication unit arranged into a same window on the display unit.

By means of the above construction, since the pairing of indicated standard color and object color are displayed in the same window, so that the user can readily confirm the correction standards which have already been indicated.

Also, the display control unit may include an object point conversion unit for setting, once a pairing of standard point and object point displayed in the same window have been selected by means of the input indication unit, the object point in the pairing to be edited, and obtaining a newly indicated object point as a valid object point.

By means of the above construction, object colors can be easily adjusted, even after they have been indicated.

Also, the object point conversion unit displays at least one of sliders, sample colors, and numerical values in order to correct values of the object point in each axis of the color space and receives an editing based on an indication by the input indication unit.

By means of the above construction, object colors can be adjusted using virtual sliders or the like which are displayed by the display unit, so that a color correction device of superior operability can be achieved.

BRIEF DESCRIPTION OF THE DRAWINGS

These and other objects, advantages and features of the invention will become apparent from the following description taken in conjunction with the accompanying drawings which illustrate specific embodiments of the invention. In the drawings.

DESCRIPTION OF THE PREFERRED EMBODIMENTS

First Embodiment

The following is a description of the color correction device of the first embodiment of the present invention, with reference to the drawings.

Figure 1:
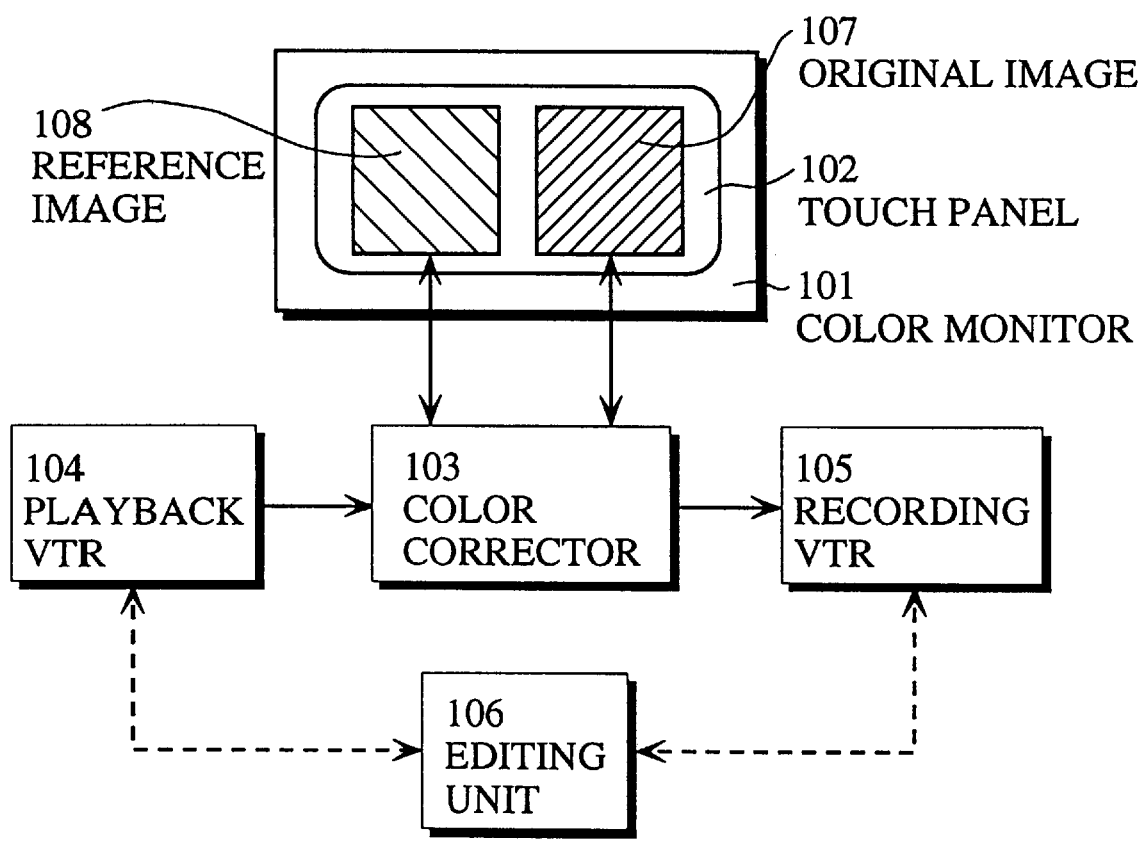
FIG. 1 shows the construction of a conventional color correction device.
Figure 2:
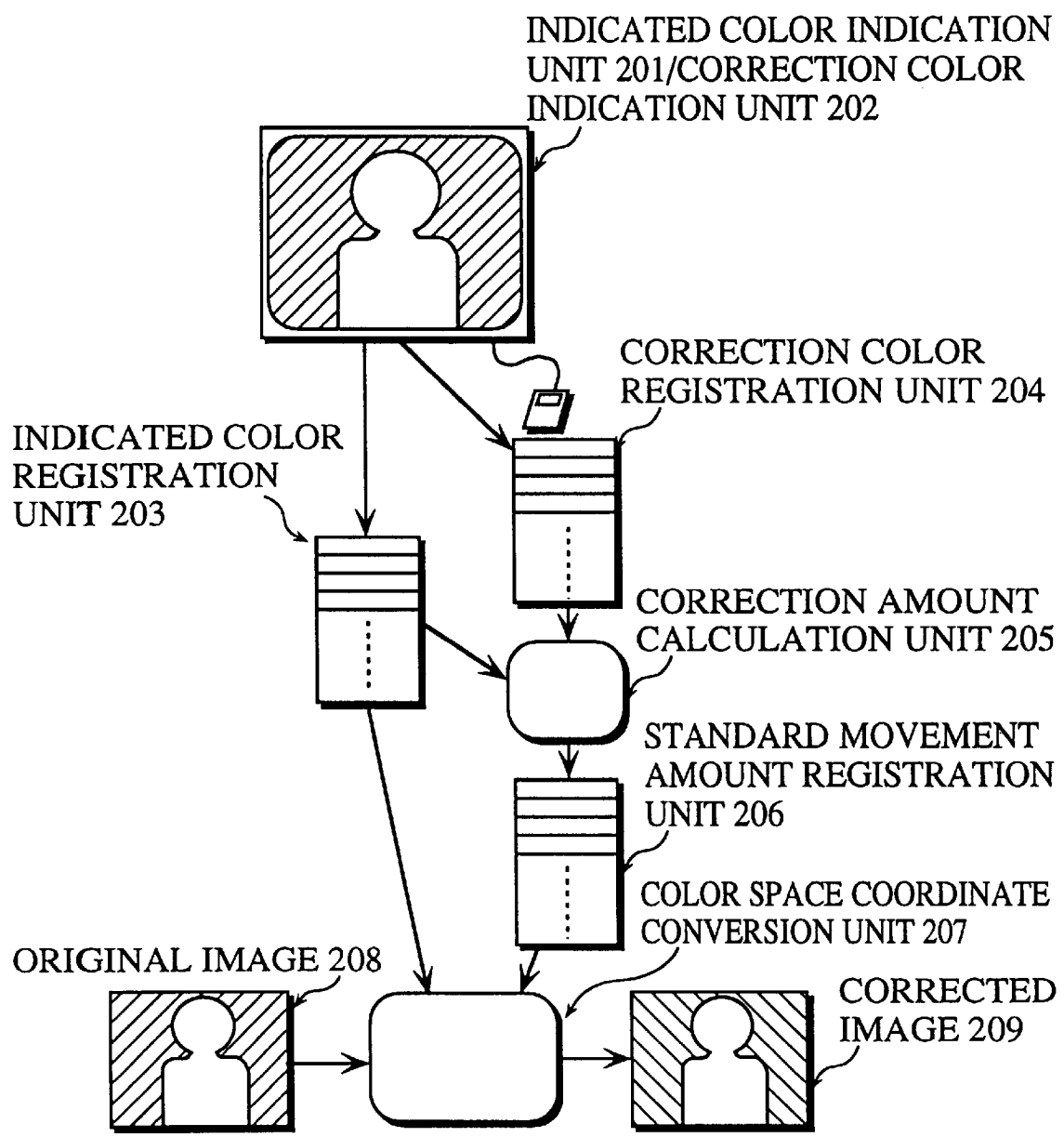
FIG. 2 shows the entire construction of the color correction device in the first embodiment of the present invention.

FIG. 2 shows the entire construction of the color correction device of the first embodiment of the present invention. In this drawing, the color correction device can be seen to include an indicated color indication unit 201, a correction color indication unit 202, an indicated color registration unit 203, a correction color registration unit 204, a correction amount calculation unit 205, a standard movement amount registration unit 206, and a color space coordinate conversion unit 207. Here in FIG. 2, the original image 208 is the image data before correction which is inputted into the present device, while the corrected image 209 is the image data after correction which is outputted by the present device.

The indicated color indication unit 201 and the correction color indication unit 202 are input devices for indicating the standards which show in what way color correction is to be performed for the original image 208 inputted into the present device. More specifically, the indicated color indication unit 201 and the correction color indication unit 202 refer to a position retrieval device, or the like, which is equipped with a display, mouse and touch panel.

The indicated color indication unit 201 is a procedure for the position retrieval device which displays the original image 208 or the like on the display and retrieves a color at a specified position in the original image 208 which is indicated by the user using the touch panel or mouse. The color indicated here by the indicated color indication unit 201 is called the indicated color.

The correction color indication unit 202 is similarly a procedure for the position retrieval device which, for example, displays a standard image on the display from which the user obtains a color which is desired after correction, or displays the coordinates in the color space of the indicated color indicated by the indicated color indication unit 201 on the display with the user directly adjusting the coordinates using the touch panel or mouse. The color indicated here by the correction color indication unit 202 is called the correction color.

The indicated color registration unit 203 registers the indicated color indicated by the indicated color indication unit 201 as coordinates in a color space. In the same way, the correction color registration unit 204 registers the correction color indicated by the correction color indication unit 202.

It should be noted here that in the present embodiment, the color space refers to a YUV space, so that all of the colors are corresponded to points in a YUV space. A YUV space is a single color space whose axes are based on signals (brightness signal (Y), color difference signals (U, V)) for specifying colors for a color television. Accordingly, each color corresponds a point specified by coordinates for the Y axis, the U axis and the V axis. Also, the indicated color and correction color indicated by the indicated color indication unit 201 and the correction color indication unit 202 are each limited to one color.

The correction amount calculation unit 205 retrieves the coordinates of the correction color registered in the correction color registration unit 204 and the coordinates of the indicated color indicated by the indicated color indication unit 201 and calculates the movement amount which it stores in the standard movement amount registration unit 206. Here, the movement amount refers to the difference in each axis of the color space between the coordinates for two points. Also, the movement amount registered in the standard movement amount registration unit 206 is called the standard movement amount and is used as a parameter for directly determining the function used by the color space coordinate conversion unit 207 during mapping.

The color space coordinate conversion unit 207 retrieves the coordinates of the indicated point registered in the indicated color registration unit 203 and the standard movement amount registered in the standard movement amount registration unit 206 and, by means of a set function using the aforementioned values, maps every pixel in the original image 208 in the YUV space, before outputting the generated data to another system (not illustrated) as the corrected image 209. It should be noted here that the original image 208 and the corrected image 209 are sets of coordinates in a YUV space for specifying the color of every pixel forming the respective images. Also, the correction amount calculation unit 205 and the color space coordinate conversion unit 207 are constructed from a CPU, RAM for the working space of the calculation, and ROM or RAM for storing the program and the like for the calculation and conversion procedures.

The following is an explanation of the operation of the color correction device of the first embodiment of the present invention.

Figure 3:
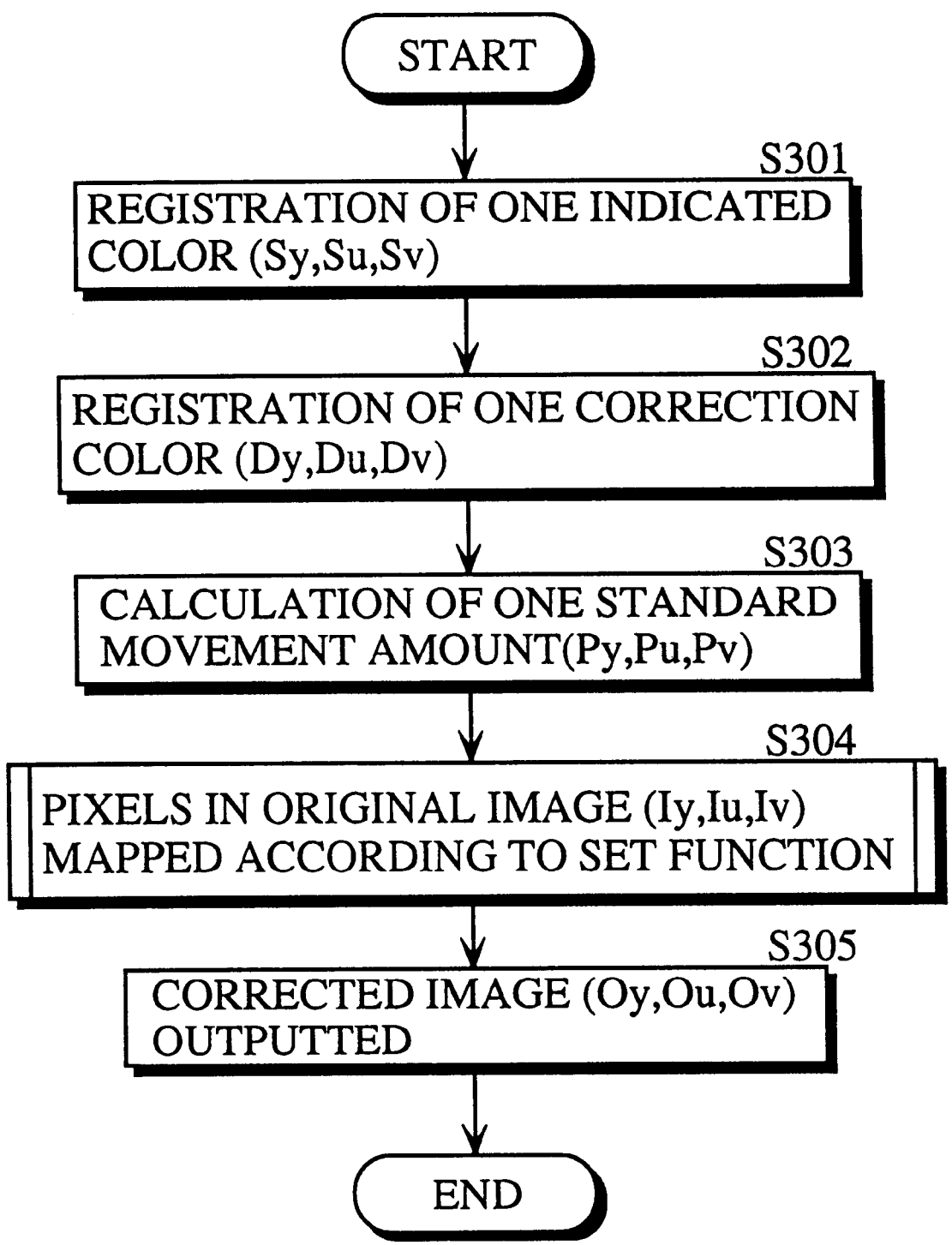
FIG. 3 is a flowchart for the operation of the color correction device in the first embodiment of the present invention.

FIG. 3 is a flowchart for the operation of the color correction device in the present embodiment.

Firstly, the indicated color indication unit 201 registers the indicated color $(S_y, S_u, S_v)$ indicated by the user in the indicated color registration unit 203 (Step S301). Here, (y, u, v) refer to the coordinates in the YUV space, with the nature of the YUV space being such that the range of values for (y, u, v) is as follows.

$$0 \leq y \leq 1$$  Equation 1

$$-0.5 \leq u \leq 0.5$$

$$-0.5 \leq v \leq 0.5$$

In the same way, the correction color indication unit 202 registers the correction color $(D_y, D_u, D_v)$ corresponding to the indicated color ($S_y$, $S_u$, $S_v$) in the correction color registration unit 204 (Step S302).

Next, the correction amount calculation unit 205 calculates the standard movement amount ($P_y$, $P_u$, $P_v$) according to the following equation (Step S303) from the indicated color ($S_y$, $S_u$, $S_v$) and the correction color ($D_y$, $D_u$, $D_v$) registered in Steps S301 and S302.

$$P_y = D_y - S_y$$
$$P_u = D_u - S_u$$
$$P_v = D_v - S_v$$
Equation 2

Next, the color space coordinate conversion unit 207 maps the original image 208 using a fixed function (Step S304), based on the correction standards hitherto obtained, which is to say the indicated color ($S_y$, $S_u$, $S_v$) and the standard movement amount ($P_y$, $P_u$, $P_v$). It then outputs the corrected image 209 obtained as a result of mapping to another system (Step S305).

Figure 4:
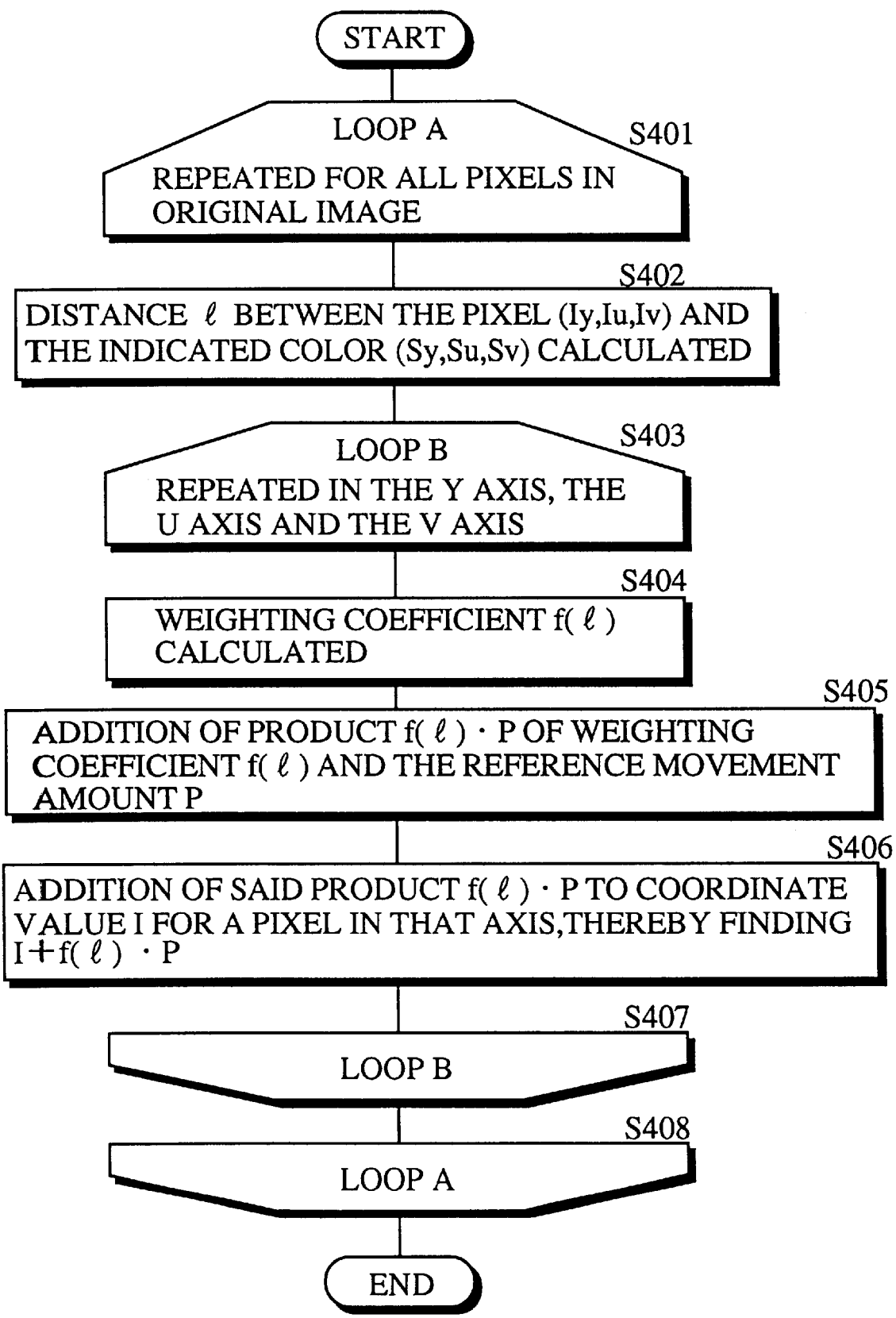
FIG. 4 is a flowchart for the details of the procedure in step S304 of the flowchart in FIG. 3.

FIG. 4 is a flowchart for the details of the procedure in step S304 in the flowchart of FIG. 3.

The color space coordinate conversion unit 207 repeats the same process for every pixel in the inputted original image 208 (Steps S401 through S408). The mapping of a single pixel ($I_y$, $I_u$, $I_v$) is as described below.

First, the distance l from the pixel ($I_y$, $I_u$, $I_v$) to the indicated color ($S_y$, $S_u$, $S_v$) in the YUV space is calculated according to the equation below (Step S402).

$$l = \sqrt{[(S_y - I_y)^2 + (S_u - I_u)^2 + (S_v - I_v)^2]}$$
Equation 3

Next, the pixel ($I_y$, $I_u$, $I_v$) is mapped in each of the Y axis, the U axis and the V axis using the same process (Steps S403 through S407).

Here, the weighting coefficient f(l) is set based on the predetermined weighting coefficient functions $f_y(\ )$, $f_u(\ )$, $f_v(\ )$ (Step S404).

Figure 5:
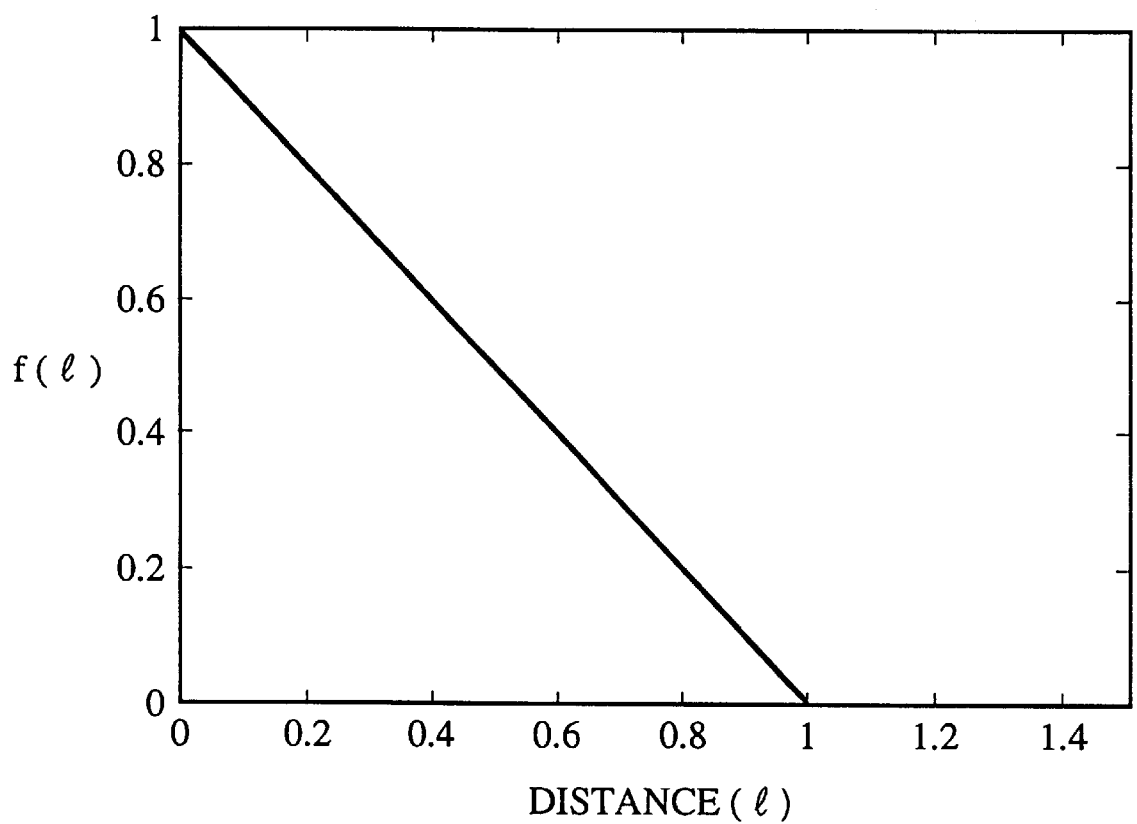
FIG. 5 shows an example of a coefficient function which satisfies equation 4 in the first embodiment of the present invention.

FIG. 5 is a graph showing the weighting coefficient function, wherein the weighting coefficient f(l) is set once a distance l is given. In this graph, the weighting coefficient f(l) is such that it decreases linearly between the range l=0 and l=1, with its value being 0 at l=1 or greater. In this embodiment, the weighting coefficient functions $f_y(\ )$, $f_u(\ )$, $f_v(\ )$ are the same in each axis, and are set according to the graph in FIG. 5. Here, if the weighting coefficient function f( ) is a function which satisfies the following conditions (for example, a function using quadratic curves and standard deviations, or sine functions and cosine functions), then the same results can be expected even if a different function to that in FIG. 5 is used.

$$0 \le f(\ ) \le 1 \text{ and}$$
$$\lim_{l \to o} f(l) = 1$$
Equation 4

Next, after the weighting coefficient f(l) determined in Step S404 has been multiplied by the standard movement amount P in one of the axes (Step S405), the product is then added to the coordinates I of that pixel (Step 406).

In this way, the mapping of the pixel ($I_y$, $I_u$, $I_v$) in the original image 208 is completed, and the corresponding pixel ($O_y$, $O_u$, $O_v$) in the corrected image 209 is generated.

$$O_y = I_y + f_y(l) \cdot P_y$$
$$O_u = I_u + f_u(l) \cdot P_u$$
Equation 5

$$O_v = I_v + f_v(l) \cdot P_v$$

The following is an explanation of a specific example of the operation of the color correction device of the present embodiment.

First, the point (0, 0, 0) is indicated by the user as the indicated point and the point (1, 0, 0) is indicated as the correction point. In order to simplify the explanation, it is supposed that a flat UV plane (Y=0) in the YUV space is inputted into the present device as the original image 208, with the following explanation describing how this is transformed by mapping.

Figure 6:
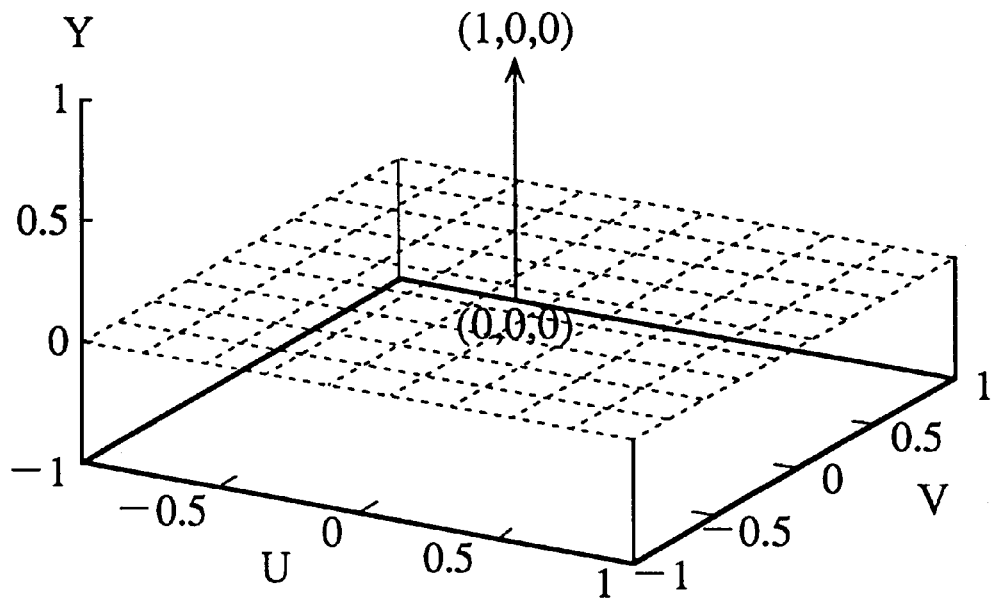
FIG. 6 shows an example of the indicated point and movement amount in the color space in the first embodiment of the present invention.

In FIG. 6, the indicated point (0, 0, 0), the correction point (1, 0, 0) and the UV plane are shown in the YUV space. In this figure, an arrow has been drawn from the indicated point (0, 0, 0) to the correction point (1, 0, 0), while the UV plane has been shown as a grid composed of dotted lines.

Figure 7:
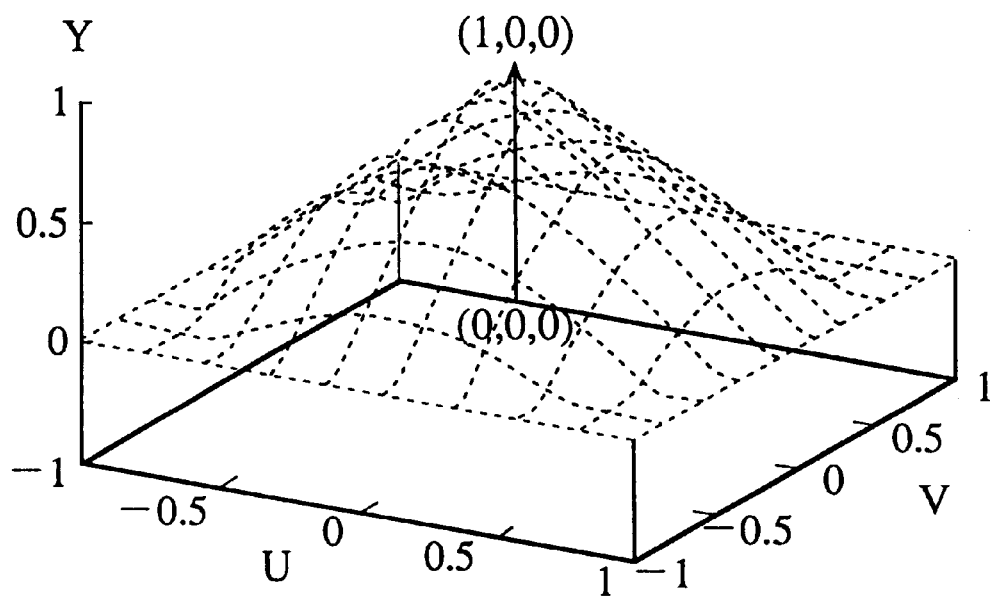
FIG. 7 shows an example of the mapping of the UV surface by the device of the first embodiment of the present invention when there is one indicated point.

FIG. 7 shows the curved surface obtained by mapping the UV plane.

As can be seen from this drawing, the UV plane is converted into a smooth curved plane by the present device. This curved plane is shaped like a rounded mountain with the point (1, 0, 0) at its peak. That is to say, the point (0, 0, 0) on the UV plane which was indicated by the user is affected the most by mapping and is moved to the point (1, 0, 0) in accordance with the user's indication, with the other points being affected to a degree which decreases the further such points are located from the indicated point (0, 0, 0), so that the amount which such points are moved decreases with distance from the indicated point.

As should be clear from the above explanation, by using the present device a user can have the color of many pixels in the inputted original image 208 corrected by an appropriate distance in the color space by merely indicating one pair of colors (an indicated color and a correction color). As a result, it is not necessary when using the present invention for a user to specify the area which is to have its color corrected, no matter what color correction is to be performed. This is to say, by merely specifying one color which he/she would like corrected by the greatest extent, a user can have other colors corrected by an appropriate amount. Also, so long as the correction standards are not altered, they will remain valid for every subsequent original image 208 which is inputted thereafter. By doing so, the number of operations performed by the user in performing color correction can be reduced.

Furthermore, the inputted original image is smoothly transformed in the YUV space. By doing so, the occurrence of false outlines, which was a problem when executing color correction by specifying an area in a YUV space, can be suppressed. That is to say, by avoiding the unnatural emphasizing of any small differences in color, an image with a smooth and natural transition of color can be achieved.

It should be noted here that although the indicated color indication unit 201 and the correction color indication unit 202 were described as obtaining the indicated color and the correction color by means of user indications, it is also possible for them to obtain the indicated color and the correction color by automatically detecting the characteristics of the original image 208.

Also, the operation of the present embodiment has been described as pertaining to a YUV space, although the same processing results can be achieved if, instead of using a YUV space, one of a CIE-LUV space (which is a uniform color space), an HSV space, HLS space or RGB space which are widely used by computers, or the like is used.

The present embodiment has been described so that the weighting coefficient function $f_y(\ )$, $f_u(\ )$, and $f_v(\ )$ is the same in each axis, although it is possible for the functions to differ between the axes. By doing so, then regardless of whether a same standard movement amount is used, the degree to which the correction has an effect on the original image 208 can be set independently in each axis.

Finally, the description of the present embodiment teaches that the concept of distance used war a straight-line distance between the two points in the YUV space, such as is shown in FIG. 3, although this concept of distance should not be construed as being limited to the definition given in FIG. 3. As one example, distance may be defined by the equation given below.

$$\text{distance} = |S_y - I_y| + |S_u - I_u| + |S_v - I_v|$$

Second Embodiment

The following is a description of color correction device of the second embodiment of the present invention, with reference to the drawings. This device is characterized by being able to execute color correction based on two or more indicated colors.

Figure 8:
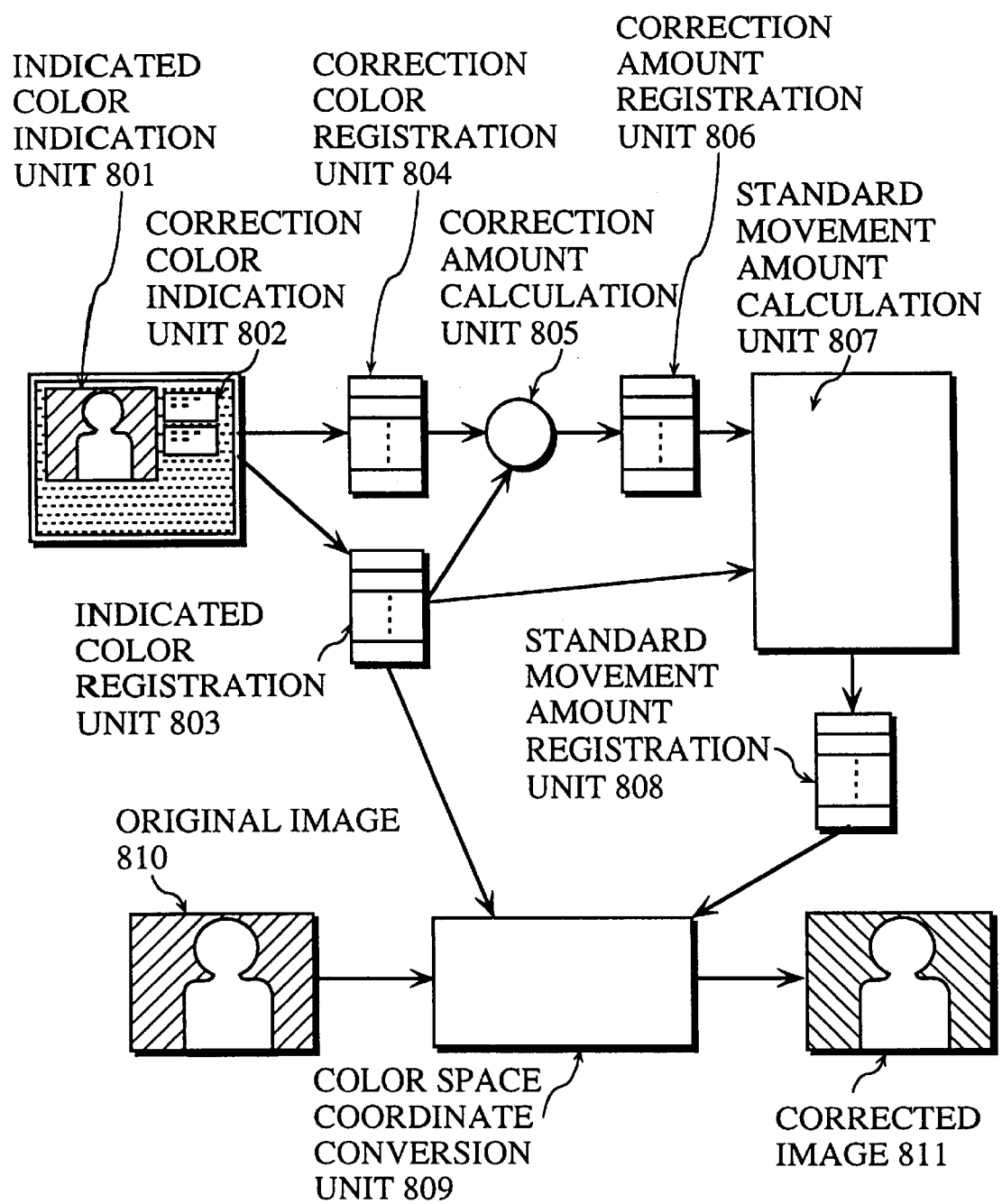
FIG. 8 shows the entire construction of the color correction device in the second embodiment of the present invention.

FIG. 8 shows the entire construction of the color correction device of the second embodiment of the present invention. In this drawing, the color correction device can be seen to include an indicated color indication unit 801, a correction color indication unit 802, an indicated color registration unit 803, a correction color registration unit 804, a correction amount calculation unit 805, a correction amount registration unit 806, a standard movement amount calculation unit 807, a standard movement amount registration unit 808, and a color space coordinate conversion unit 809.

The construction of the device of the present embodiment includes a correction amount registration unit 806 and a standard movement amount calculation unit 807, in addition to the construction of the first embodiment. That is to say, with the exception of the ability to handle two or more pairs of an indicated color and a correction color, the construction elements 801–805, 808 and 809 are the same as construction elements 201–207 in the first embodiment. In the same way, the original image 810 and the corrected image 811 are the same as the original image 208 and the corrected image 209 in the first embodiment. Accordingly, the explanation of the present embodiment will focus on the differences with the first embodiment.

A plurality of indicated colors indicated by the indicated color indication unit 801 are registered in the indicated color registration unit 803 and, corresponding to these indicated colors, a plurality of correction colors indicated by the correction color indication unit 802 are registered by the correction color registration unit 804. That is to say, a number of pairs of an indicated color and a correction color indicated by the user are set as the standards for color correction.

The correction amount calculation unit 805 calculates a number of movement amounts, each corresponding to a pair of an indicated color and a correction color from the number of pairs of an indicated color and a correction color registered in the indicated color registration unit 803 and in the correction color registration unit 804, and registers the movement amounts in the correction amount registration unit 806. It should be noted here that the movement amounts registered in the correction amount registration unit 806 will be especially referred to as correction amounts. In other words, the correction amounts are the differences in the coordinates between each indicated color and its corresponding correction color in each axis of the color space.

The standard movement amount calculation unit 807 retrieves the indicated colors registered in the indicated color registration unit 803 and the correction amounts registered in the correction amount registration unit 806 and, following a set procedure, calculates a standard movement amount which corresponds to each pair (indicated color.correction color) and registers these amounts in the standard movement amount registration unit 808.

The color space coordinate conversion unit 809 generates the corrected image 811 by mapping the inputted original image 810 based on the plurality of indicated colors registered in the indicated color registration unit 803 and on the corresponding standard movement amounts registered in the standard movement amount registration unit 808, before outputting the corrected image 811 to another system.

Figure 9:
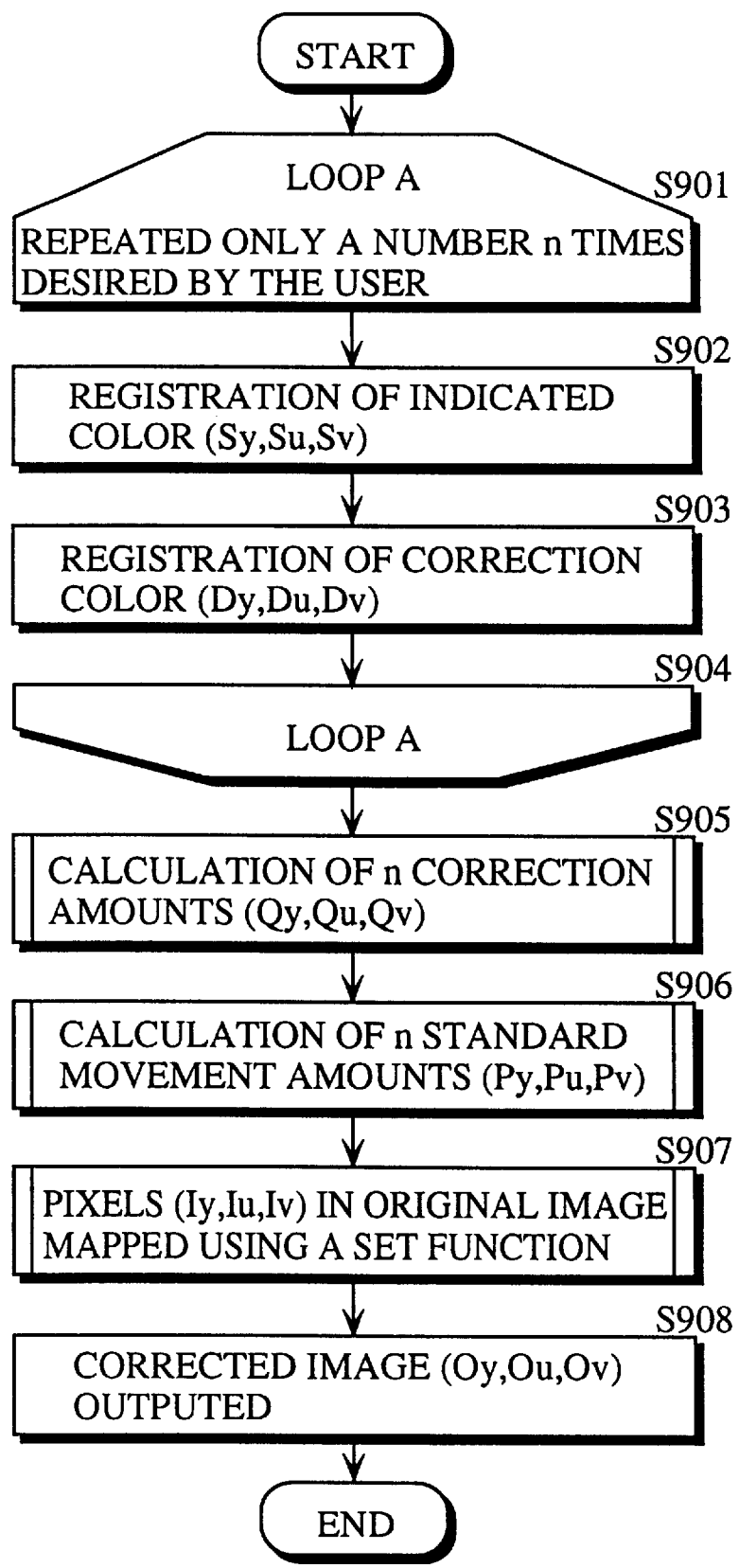
FIG. 9 is a flowchart for the operation of the color correction device in the second embodiment of the present invention.

The following is an explanation of the operation of the color correction device of the second embodiment of the present invention. Here, FIG. 9 is a flowchart for the operation of the present color correction device.

This flowchart corresponds to the flowchart shown in FIG. 3 for the first embodiment, but differs from that shown in the first embodiment in the following two aspects. These are that firstly there is the premise for the present device that processing is executed after the input of a plurality of pairs of indicated color.correction color and that secondly, in order to calculate the standard movement amount ($P_y$, $P_u$, $P_v$), the correction amount ($Q_y$, $Q_u$, $Q_v$) is calculated (Step S904) before the standard movement amount ($P_y$, $P_u P_v$) is calculated.

The indicated color indication unit 801 and the correction color indication unit 802 obtain a plurality (n) of indicated colors ($S_{y1}$, $S_{u1}$, $S_{v1}$) to ($S_{yn}$, $S_{un}$, $S_{vn}$) and a plurality (n) of corresponding correction colors ($D_{y1}$, $D_{u1}$, $D_{v1}$) to ($D_{yn}$, $D_{un}$, $D_{vn}$) in accordance with the indications from the user and register the colors in the indicated color registration unit 803 and in the correction color registration unit 804, respectively (Steps S901–S904). Here, the coordinates for the registered n indicated colors and the n correction colors are as given in the matrices below.

$$[S_y] = \begin{bmatrix} S_{y1} \\ S_{y2} \\ \vdots \\ S_{yn} \end{bmatrix} \quad [S_u] = \begin{bmatrix} S_{u1} \\ S_{u2} \\ \vdots \\ S_{un} \end{bmatrix} \quad [S_v] = \begin{bmatrix} S_{v1} \\ S_{v2} \\ \vdots \\ S_{vn} \end{bmatrix} \quad \text{Equation 6}$$

$$[D_y] = \begin{bmatrix} D_{y1} \\ D_{y2} \\ \vdots \\ D_{yn} \end{bmatrix} \quad [D_u] = \begin{bmatrix} D_{u1} \\ D_{u2} \\ \vdots \\ D_{un} \end{bmatrix} \quad [D_v] = \begin{bmatrix} D_{v1} \\ D_{v2} \\ \vdots \\ D_{vn} \end{bmatrix} \quad \text{Equation 7}$$

Next, the correction amount calculation unit 805 retrieves these n pairs of indicated color.correction color and using the equations given below calculates the movement amounts, before registering the results in the correction amount registration unit 806 as the correction amount ($Q_y$, $Q_u$, $Q_v$) (Step S905).

$$[Q_y] = [D_y] - [S_y] \quad \text{Equation 8}$$
$$[Q_u] = [D_u] - [S_u]$$
$$[Q_v] = [D_v] - [S_v]$$

Figure 10:
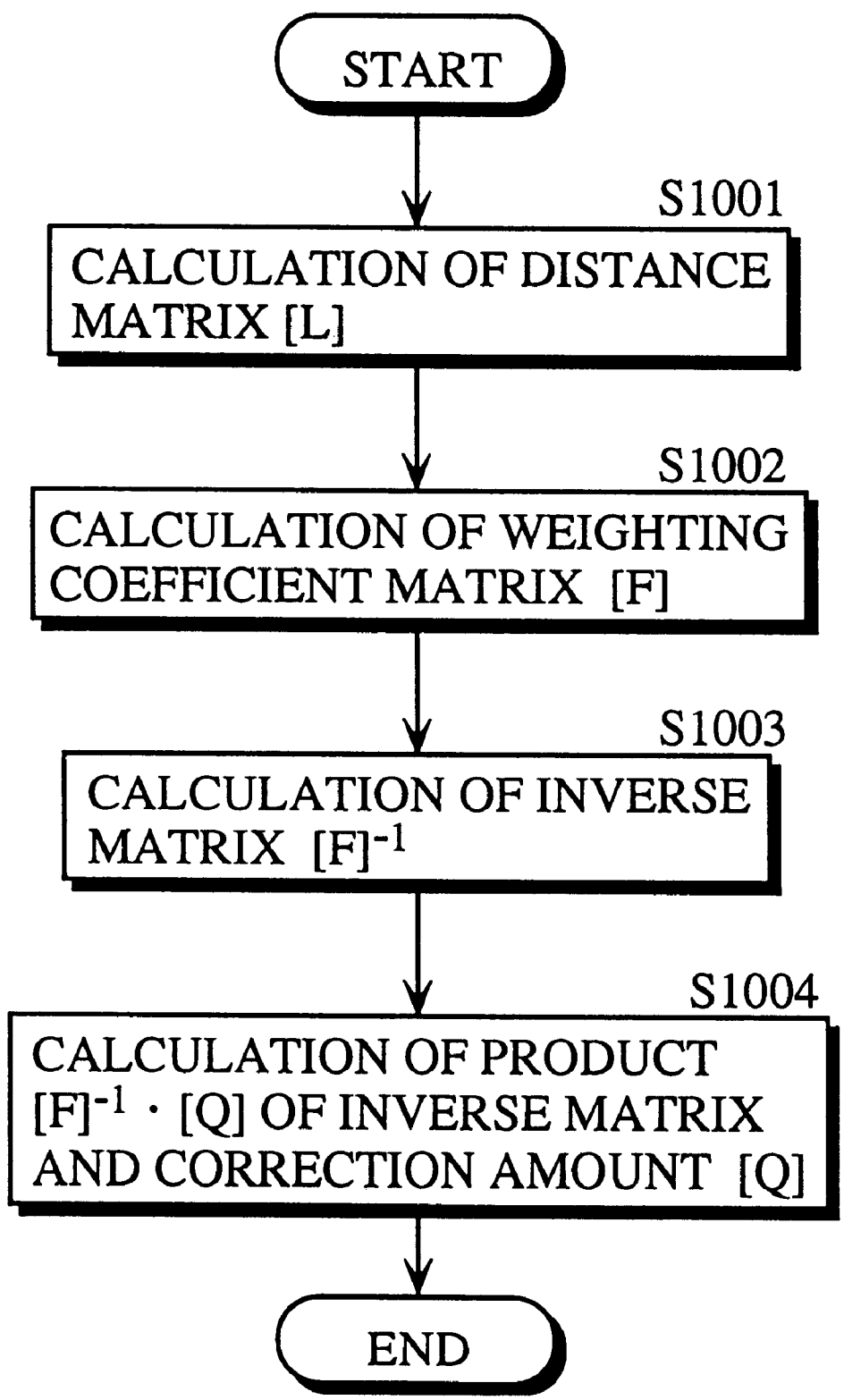
FIG. 10 is a flowchart for the details of the procedure in step S906 of the flowchart in FIG. 9.

Next, the standard movement amount calculation unit 807 retrieves the n indicated colors ($S_y$, $S_u$, $S_v$) registered in the indicated color registration unit 803 and the n correction amounts ($Q_y$, $Q_u$, $Q_v$) registered in the correction amount registration unit 806, calculates the standard movement amounts ($P_y$, $P_u$, $P_v$) and registers the standard movement amounts in the standard movement amount registration unit 808 (Step S906). The details of the processing procedure in Step S906 are explained below with reference to the flowchart shown in FIG. 10.

First, the standard movement amount calculation unit 807 retrieves the n indicated colors ($S_y$, $S_u$, $S_v$) registered in the indicated color registration unit 803 and calculates the distances l in the YUV space between all possible combinations of two indicated points, including duplication (Step S1001). That is to say, using the equation given below, the distance $l_{11}$ between the indicated color ($S_{y1}$, $S_{u1}$, $S_{v1}$) and the indicated color ($S_{y1}$, $S_{u1}$, $S_{v1}$) the distance $l_{12}$ between the indicated color ($S_{y1}$, $S_{u1}$, $S_{v1}$) and the indicated color ($S_{y2}$, $S_{u2}$, $S_{v2}$), ... the distance $l_{ij}$ between the indicated color ($S_{yi}$, $S_{ui}$, $S_{vi}$) and the indicated color ($S_{yj}$, $S_{uj}$, $S_{vj}$), ... and the distance $l_{nn}$ between the indicated color ($S_{yn}$, $S_{un}$, $S_{vn}$) and the indicated color ($S_{yn}$, $S_{un}$, $S_{vn}$) are found.

$$l_{ij} = \sqrt{[(S_{yi} - S_{yj})^2 + (S_{ui} - S_{uj})^2 + (S_{vi} - S_{vj})^2)]} \quad \text{Equation 9}$$

The group of n*n obtained distances l can then be expressed as the matrix [L] (hereinafter called the distance matrix) which is shown below.

$$[L] = \begin{bmatrix} l_{11} & \cdots & l_{1n} \\ \vdots & \ddots & \vdots \\ l_{nl} & \cdots & l_{nn} \end{bmatrix} \quad \text{Equation 10}$$

Next, the standard movement amount calculation unit 807 uses the same weighting coefficient functions $f_y(\ )$, $f_u(\ )$ and $f_v(\ )$ as the first embodiment and calculates (Step 1002) the weighting coefficient matrices $[F_y]$, $[F_u]$ and $[F_v]$ (hereinafter called the weighting coefficient matrices) corresponding to the distance matrix [L] found in step 1001.

The weighting coefficient matrices $[F_y]$, $[F_u]$ and $[F_v]$ are shown below.

$$[F_y] = \begin{bmatrix} f_y(l_{11}) & \cdots & f_y(l_{1n}) \\ \vdots & \ddots & \vdots \\ f_y(l_{nl}) & \cdots & f_y(l_{nn}) \end{bmatrix} \quad \text{Equation 11}$$

$$[F_u] = \begin{bmatrix} f_u(l_{11}) & \cdots & f_u(l_{1n}) \\ \vdots & \ddots & \vdots \\ f_u(l_{nl}) & \cdots & f_u(l_{nn}) \end{bmatrix}$$

$$[F_v] = \begin{bmatrix} f_v(l_{11}) & \cdots & f_v(l_{1n}) \\ \vdots & \ddots & \vdots \\ f_v(l_{nl}) & \cdots & f_v(l_{nn}) \end{bmatrix}$$

After this, the standard movement amount calculation unit 807 calculates the inverse matrices $[F_y]^{-1}$, $[F_u]^{-1}$ and $[F_v]^{-1}$ (Step S1003) for the weighting coefficient matrices $[F_y]$, $[F_u]$ and $[F_v]$ obtained in Step S1002.

Finally, the standard movement amount calculation unit 807 calculates the products of the inverse matrices and the correction amounts registered in the correction amount registration unit 806 and registers the results as the standard movement amounts ($P_y$, $P_u$, $P_v$) in the standard movement amount registration unit 808 (Step S1004).

$$[P_y] = [F_y]^{-1} \cdot [Q_y] \quad \text{Equation 12}$$
$$[P_u] = [F_u]^{-1} \cdot [Q_u]$$
$$[P_v] = [F_v]^{-1} \cdot [Q_v]$$

By means of the above procedure, once the standard movement amounts ($P_y$, $P_u$, $P_v$) have been calculated (Step S906), the color space coordinate conversion unit 809 maps the inputted original image 810 (Step S907) based on the standard movement amounts ($P_y$, $P_u$, $P_v$) and the n indicated colors ($S_y$, $S_u$, $S_v$) registered in the indicated color registration unit 803 and outputs the mapped result as the corrected image (Step S908).

Figure 11:
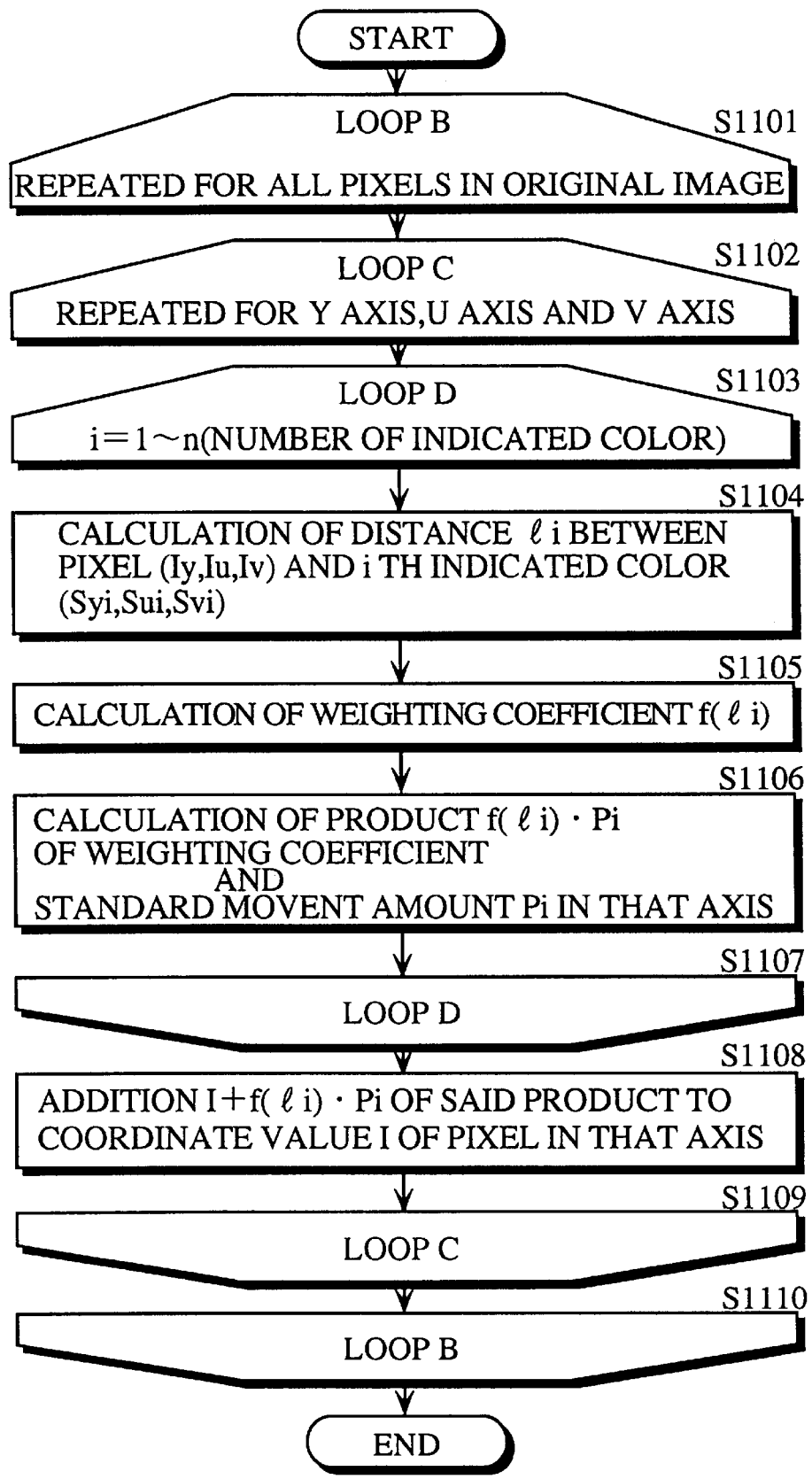
FIG. 11 is a flowchart for the details of the procedure in step S907 of the flowchart in FIG. 9.

FIG. 11 is a flowchart showing the details of the procedure in Step S907. This flowchart corresponds to the flowchart in FIG. 4 which related to the first embodiment.

As can be seen from the drawings, there is no fundamental difference in the procedures. However, the present embodiment differs from the first embodiment in that the color space coordinate conversion unit 809 performs mapping for a number of indicated colors ($S_y$, $S_u$, $S_v$) and a number of standard movement amounts ($P_y$, $P_u$, $P_v$) (Steps S1103–S1107). That is to say, the color space coordinate conversion unit 809 maps the pixels ($I_y$, $I_u$, $I_v$) of the original image 810 using the equations given below and in doing so generates the pixels ($O_y$, $O_u$, $O_v$) in the corrected image 811.

$$O_y = I_y + \Sigma(f_y(l_i) \cdot P_{yi}) \quad \text{Equation 13}$$
$$O_u = I_u + \Sigma(f_u(l_i) \cdot P_{ui})$$
$$O_v = I_v + \Sigma(f_v(l_i) \cdot P_{vi})$$

wherein $i_v$ is the distance in the YUV space between the pixel ($I_y$, $I_u$, $I_v$) and the ith indicated color ($S_y$, $S_u$, $S_v$).

As can be seen clearly from the above equation, pixels ($I_y$, $I_u$, $I_v$) in the original image are affected by a plurality of standard movement amounts and so are mapped by the present device so as to become the pixels ($O_y$, $O_u$, $O_v$. Here, the degree of each of these effects decreases as the distance between the pixel ($I_y$, $I_u$, $I_v$) and the indicated color ($S_y$, $S_u$, $S_v$) increases.

It should be noted here that the above equation corresponds to Equation 5 for the first embodiment. It should be obvious that Equation 13 will equate to Equation 5 when n=1.

The following is an explanation of the significance of the mapping function given in Equation 13. In order to simplify matters, the explanation only deals with the Y axis.

The relationship given below can be found by rearranging Equation 12.

$$[Q_y] = [F_y] \cdot [P_y] \quad \text{Equation 14}$$

Expressing this in terms of each element in this equation gives:

$$Q_{yl} = f_y(l_{11}) \cdot P_{yl} + \quad \text{Equation 15}$$
$$f_y(l_{12}) \cdot P_{y2} +$$
$$\vdots$$
$$f_y(l_{1n}) \cdot P_{yn}$$

Here, one pixel ($I_y$, $I_u$, $I_v$) is set so as to correspond to the first indicated color ($S_{y1}$, $S_{u1}$, $S_{v1}$), or in other words, $I_y$ is set to equal $S_{y1}$, so that Equation 13 can be expressed as shown below.

$O_y = S_{y1} + \Sigma(f_y(l_i) \cdot P_{yi})$  Equation 16

The second term on the right side of the above equation is $Q_{y1}$, shown in Equation 15, so that by referring to Equation 8, Equation 16 can be expressed as shown below.

$$O_y = S_{y1} + \sum (f_y(l_i) \cdot P_{yi})$$  Equation 17
$$= S_{y1} + Q_{y1}$$
$$= D_{y1}$$

Using the reasoning shown above, it can be proved that when a pixel in the original image 810 corresponds to an indicated color ($S_y$, $S_u$, $S_v$), said pixel will be corrected so as to become the corresponding indicated correction color ($D_y$, $D_u$, $D_v$). That is to say, even if there is a plurality of colors indicated by the user (indicated colors), the corresponding colors in the original image 810 will be corrected so as to definitely become the colors indicated by the user.

The following is an explanation of the above statement with reference to FIGS. 12 to 18.

Figure 12:
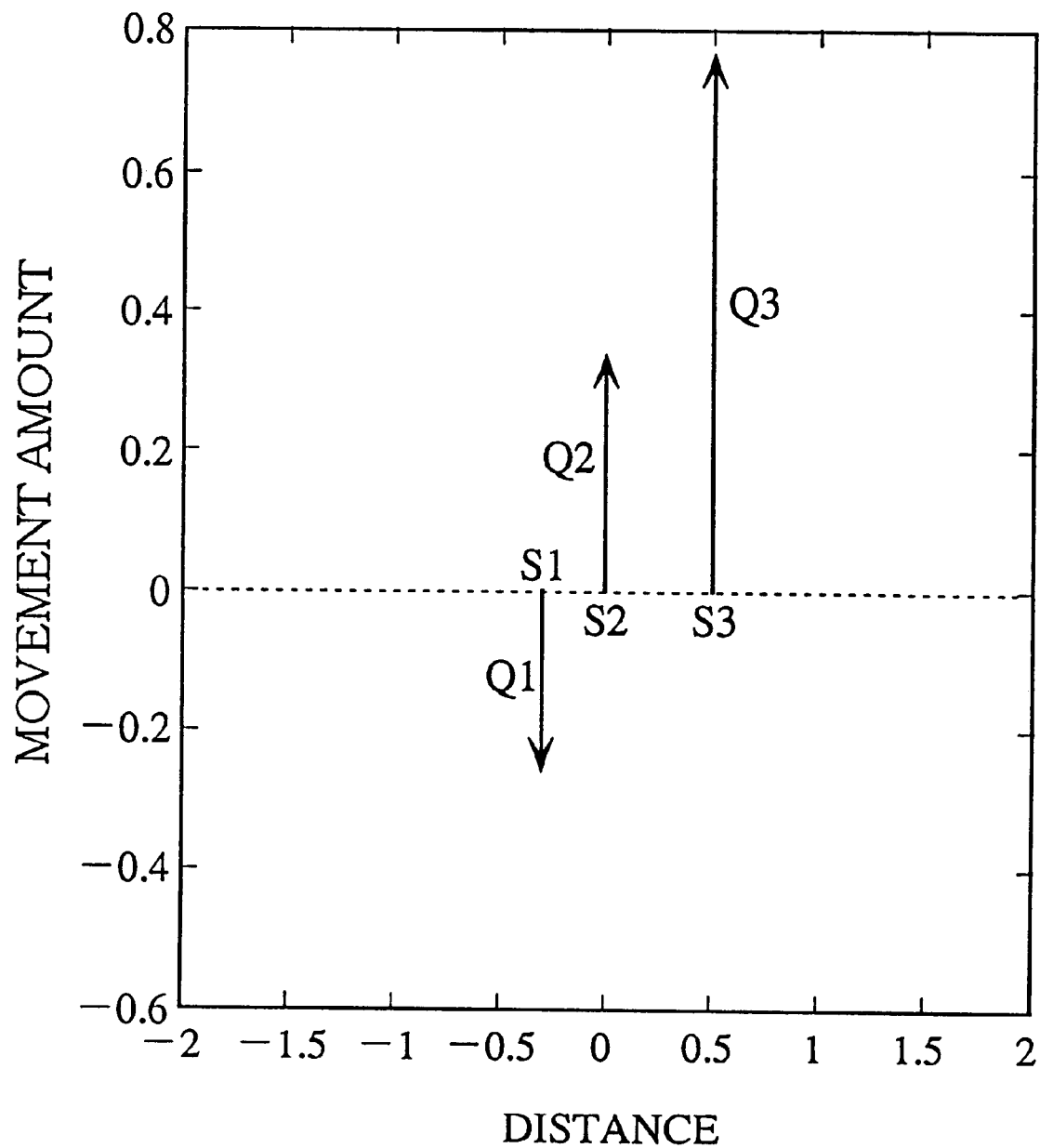
FIG. 12 shows an example of some indicated points and their respective movement amounts in the second embodiment of the present invention.

If it is supposed that three indicated points $S_1$, $S_2$, $S_3$ are registered in the indicated color registration unit 803 and movement amounts, which is to say the three correction amounts $Q_1$, $Q_2$, $Q_3$, corresponding to the indicated points $S_1$, $S_2$, $S_3$ are registered in the correction amount registration unit 806, then the relations between them can be expressed as shown in FIG. 12. Here, the horizontal axis in FIG. 12 represents distance while the vertical axis represents the movement amount.

Figure 13:
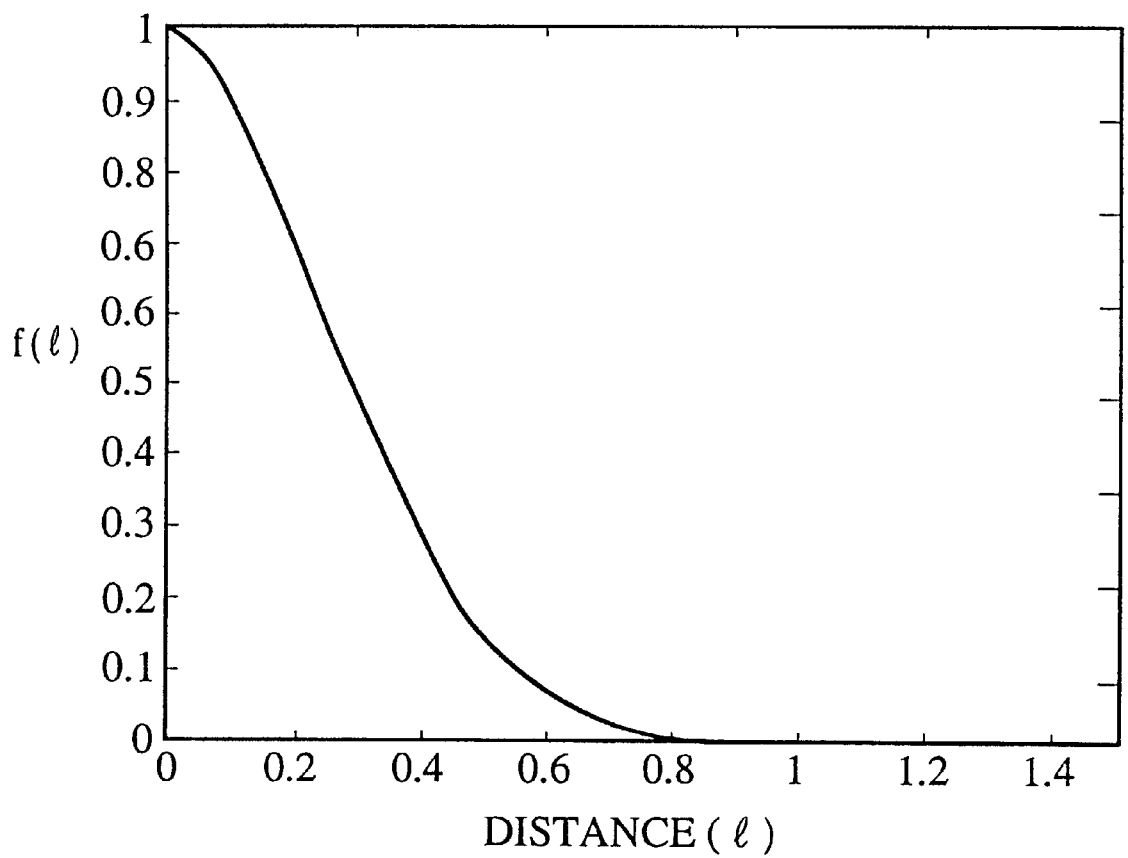
FIG. 13 shows an example of a weighting coefficient function in the second embodiment of the present invention.
Figure 14:
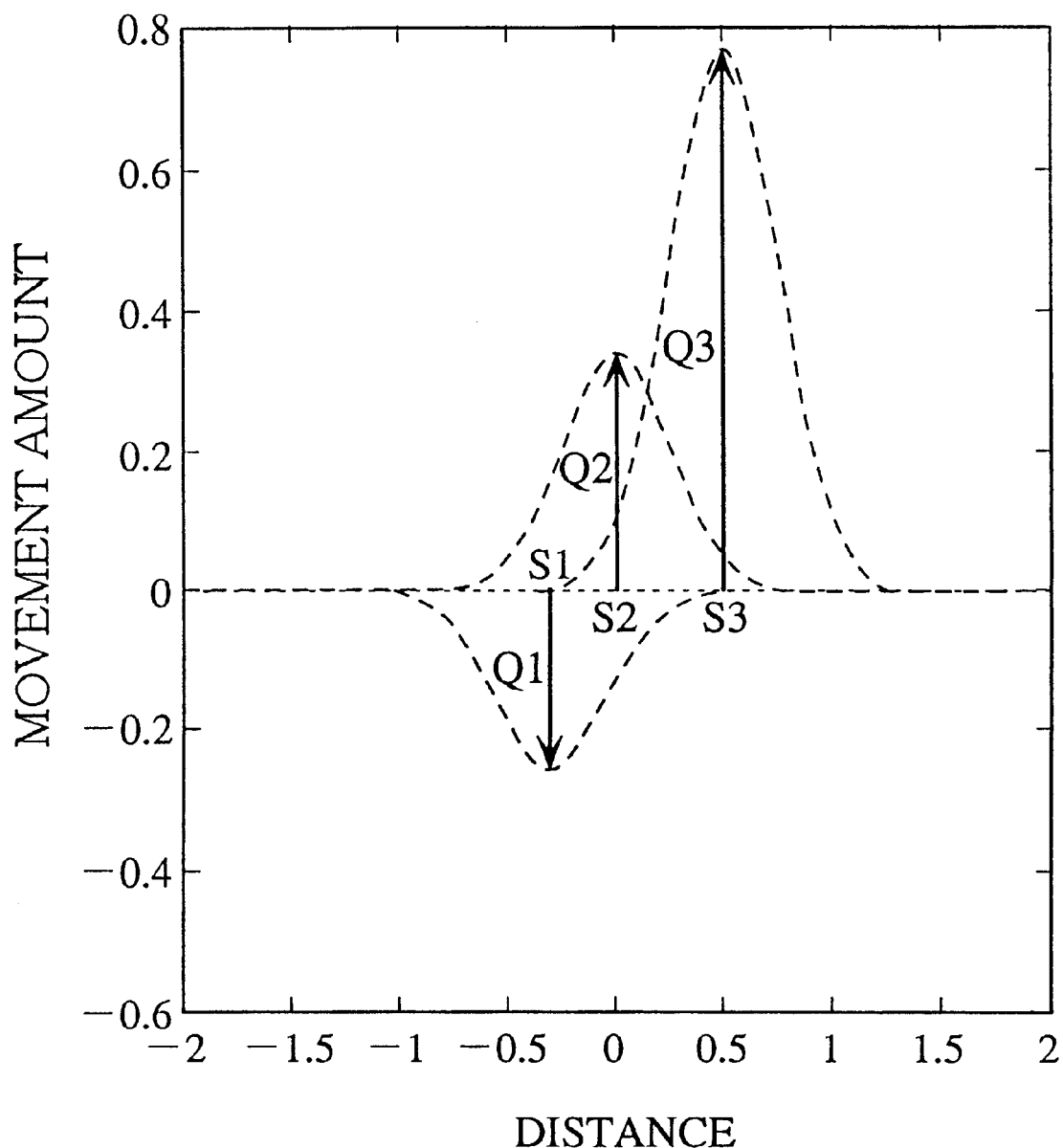
FIG. 14 shows an example of the effects (movement amounts) of the correction amounts on each of the points to be corrected in the color space in the second embodiment of the present invention.

Here, if the weighting coefficient function shown in FIG. 13 is used, then the effects due to each of the indicated points shown in FIG. 12 can be expressed by graphs with the indicated points as vertices, such as those shown in FIG. 14. If the movement amount for each pixel in the original image 810 is set as a net total of the effects caused by these three indicated points, then the net total of these three weighting coefficient functions will be as shown in the graph in FIG. 15.

Figure 15:
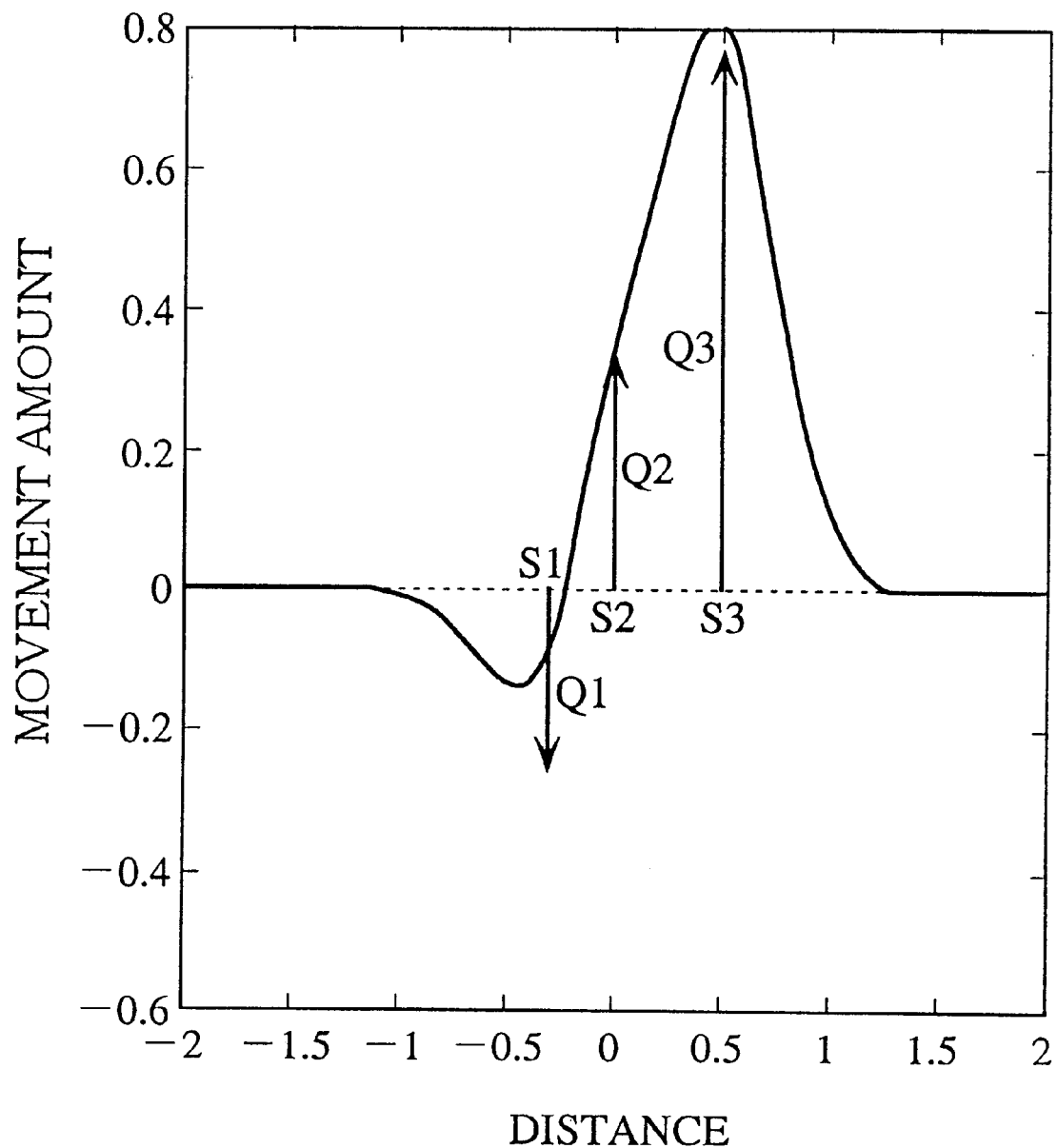
FIG. 15 shows the combination of the effects shown in FIG. 14 for the second embodiment of the present invention.

However, for the graph in FIG. 15, since the movement amounts for indicated points $S_1$ and $S_3$ do not coincide with the correction amounts $Q_1$ and $Q_3$ indicated by the correction amount registration unit 806, then it can be seen that the indicated correction for the colors of indicated points $S_1$ and $S_3$ has not been performed.

Figure 16:
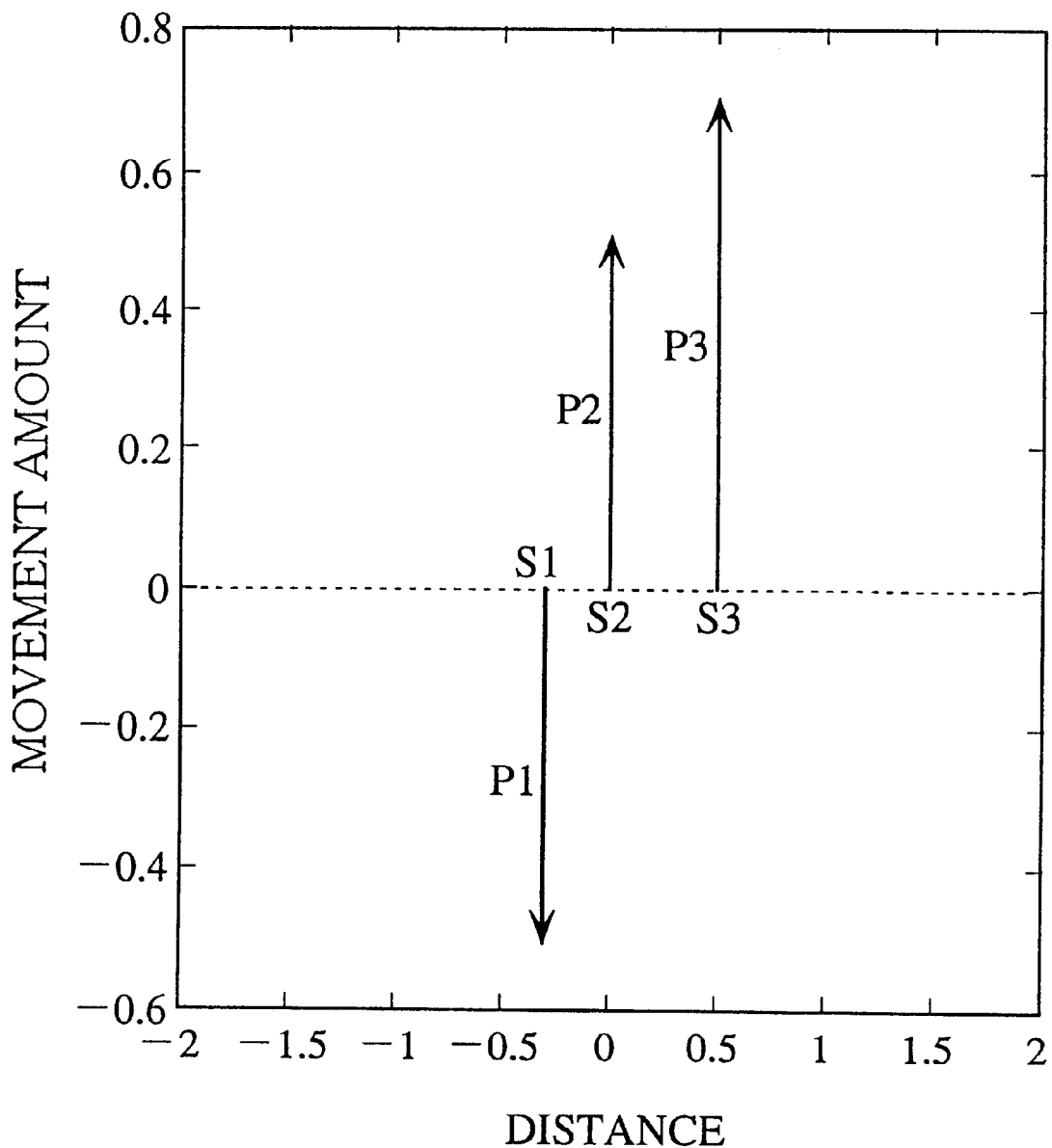
FIG. 16 shows an example of the standard movement amounts for the indicated points in the second embodiment of the present invention.
Figure 17:
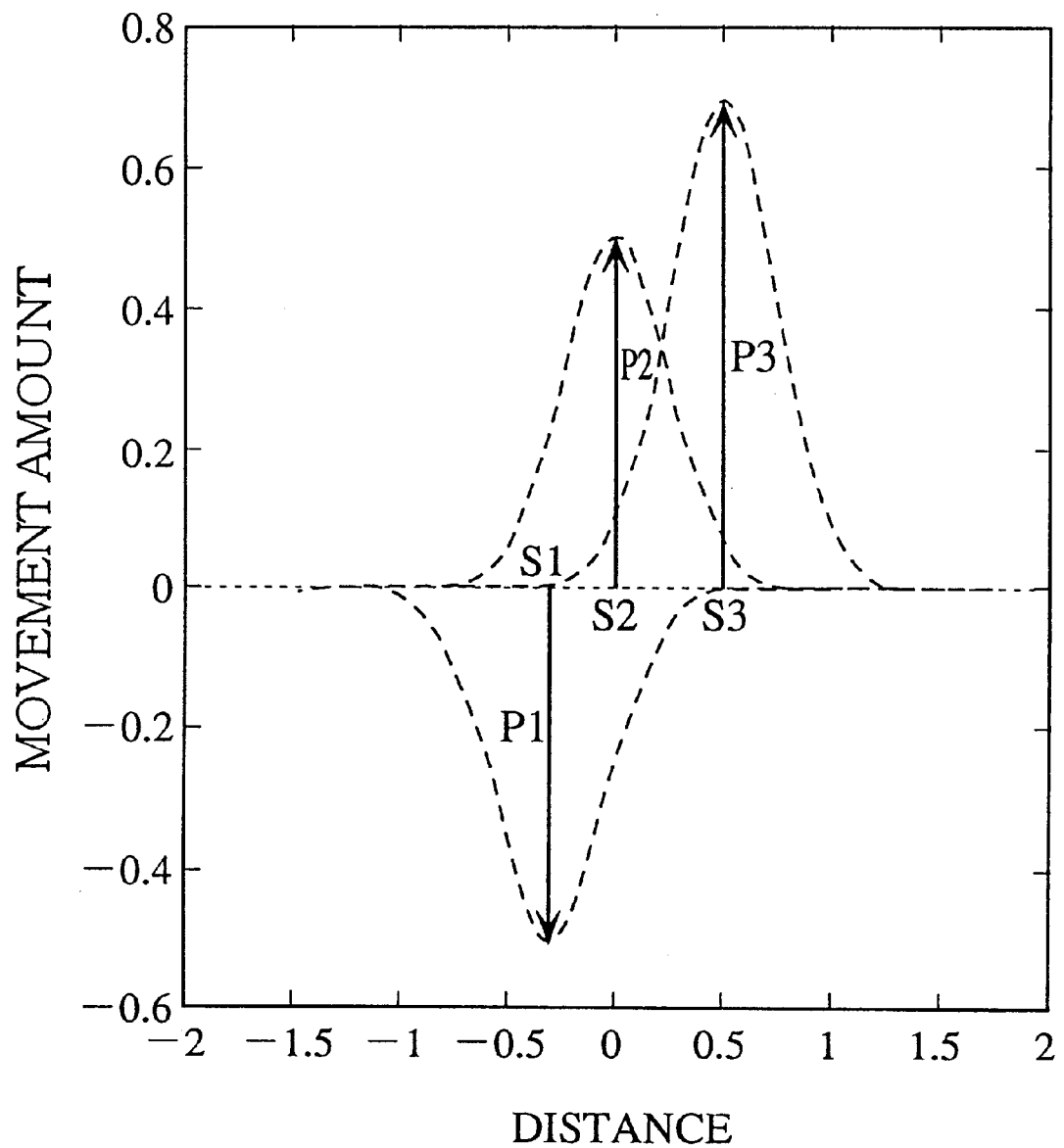
FIG. 17 shows an example of the effects (movement amounts) of the standard movement amounts on each of the points to be corrected in the color space in the second embodiment of the present invention.
Figure 18:
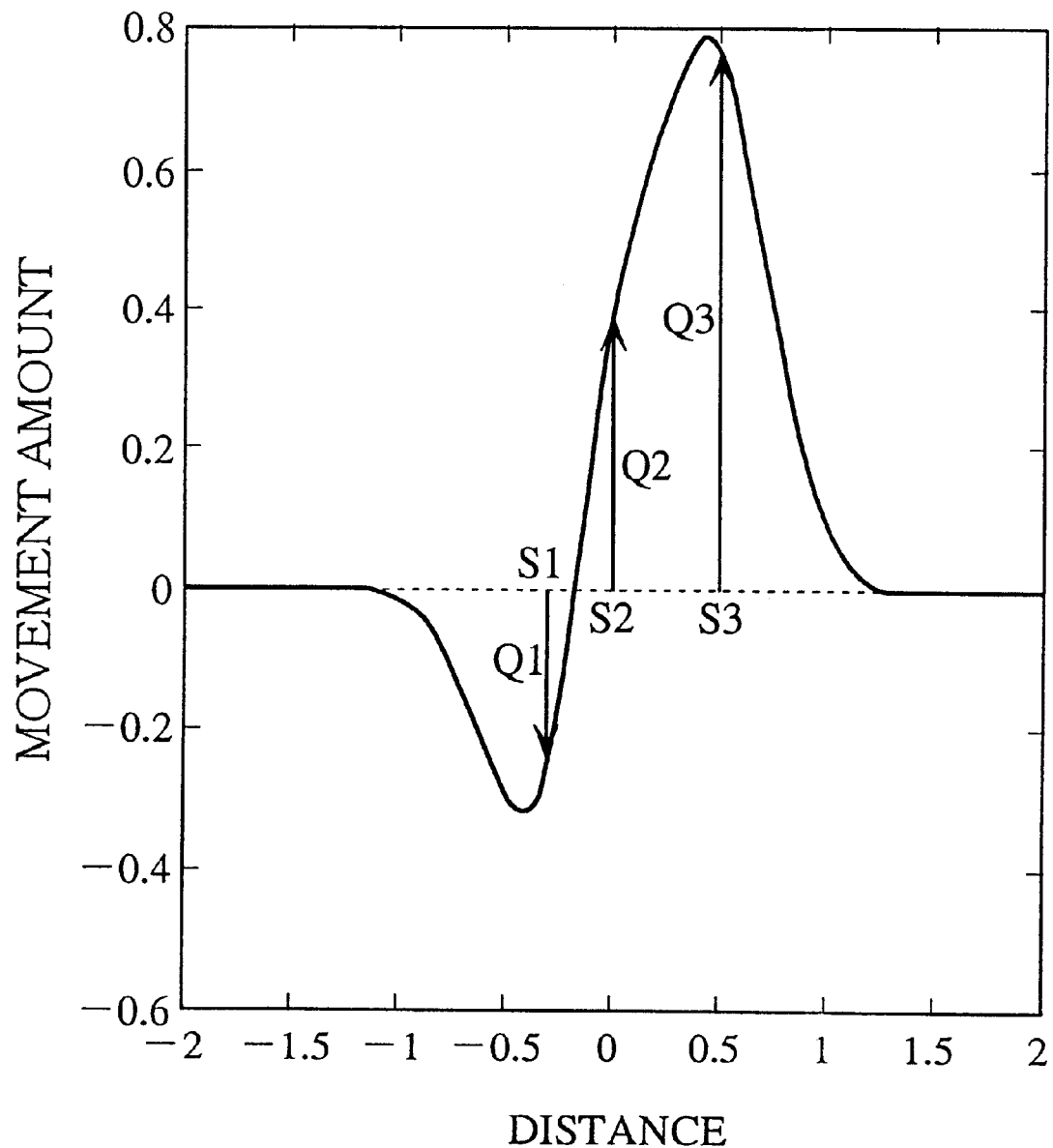
FIG. 18 shows the combination of the effects shown in FIG. 17 for the second embodiment of the present invention
Figure 19:
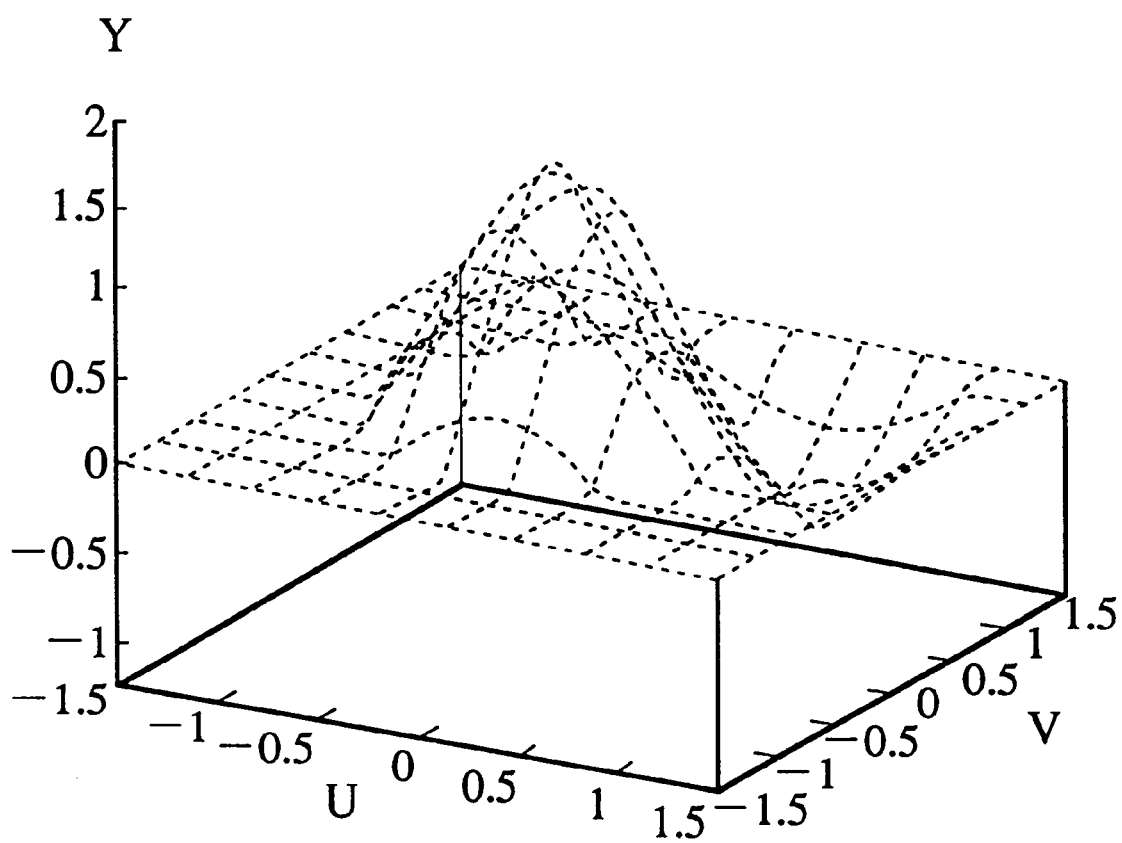
FIG. 19 shows an example of the mapping of the UV surface by the device of the second embodiment of the present invention when there is a plurality of indicated points.

To remedy this, the standard movement amount calculation unit 807 finds the movement amount, or in other words the standard movement amounts $P_1$, $P_2$ and $P_3$, for setting the movement amounts at the indicated points so as to coincide with the correction amounts. FIG. 16 shows a graph which expresses the distances and movement amounts for each of these standard movement amounts $P_1$, $P_2$ and $P_3$, while FIG. 17 shows the separate effects given by these standard movement amounts $P_1$, $P_2$ and $P_3$, which is to say the separate weighting coefficient functions, and FIG. 18 shows the combined effects of these weighting coefficient functions. It should be noted here that the curved surface in FIG. 19 represents the expansion in three axes of the graph shown in one axis in FIG. 18, with this graph corresponding to FIG. 7 for the first embodiment.

As should be clear from the graph shown in FIG. 18, the graph becomes a curve which passes the three colors wherein each of the indicated points $S_1$, $S_2$ and $S_3$ has been moved by its respective correction amount $Q_1$, $Q_2$ or $Q_3$, these colors being the correction colors. This means the indicated colors $S_1$, $S_2$ and $S_3$ are corrected by the color space coordinate conversion unit 809 so as to become the correction colors. As a result, the pixels in the original image 810 whose color coincides with an indicated color will have their color corrected so as to become the corresponding correction color which was indicated by the user.

By means of the color correction device of the present embodiment constructed as described above, then even when the user indicates the standards for color correction by indicating a plurality of pairs of indicated color.correction color, color correction of the original image can be executed based on these standards. Accordingly, for the present device, it is possible to avoid a repetitive operation wherein the color correction of the original image 810 is first performed by the present device for one pair of indicated color.correction color, then in the same way for another pair of indicated color.correction color, and then for yet another pair of indicated color.correction color, which means that the amount of processing necessary for color correction can be reduced.

Also, if a color coincides with an indicated color in the original image 810, then it can be guaranteed that this color will be corrected so as to become the correction color which was indicated corresponding to said color. In this way, the user can clearly understand the standards for color correction to be indicated to the present device and so can soon achieve the desired color correction.

Furthermore, even if a color does not coincide with an indicated color in the original image 810, then said color can be corrected to a color obtained by interpolation on a smooth curved surface which passes through all of the indicated points. By doing so, it is possible for the present device to execute smooth, natural mapping of the original image 810 based on a plurality of indicated pairs of indicated color-.correction color, so that the occurrence of false outlines due to mapping can be avoided.

Finally, by merely adding a means for calculating a simple linear equation to the device of the first embodiment, it is possible to realize a color correction device which uses a plurality of pairs of indicated color.correction color.

It should be noted that more specifically for the present device, the correction amount calculation unit 805, the standard movement amount calculation unit 807 and the color space coordinate conversion unit 809 are constructed in the same way as the first embodiment of a normal CPU, RAM for the working space of the calculation, and ROM or RAM for storing the program and the like for the calculation and conversion procedures, although these construction elements should not be construed as being limited to such. It is also possible to construct these elements so as to speed up the same calculation in each axis or the same calculation for each pixel using a vector processor, an array processor, a specialized logic circuit or a multiplier.

Third Embodiment

The following is an explanation of the third embodiment of the present invention with reference to the drawings. In this embodiment, all of the correction points corresponding to all of the points in the color space are found by means of interpolation and extrapolation.

Figure 20:
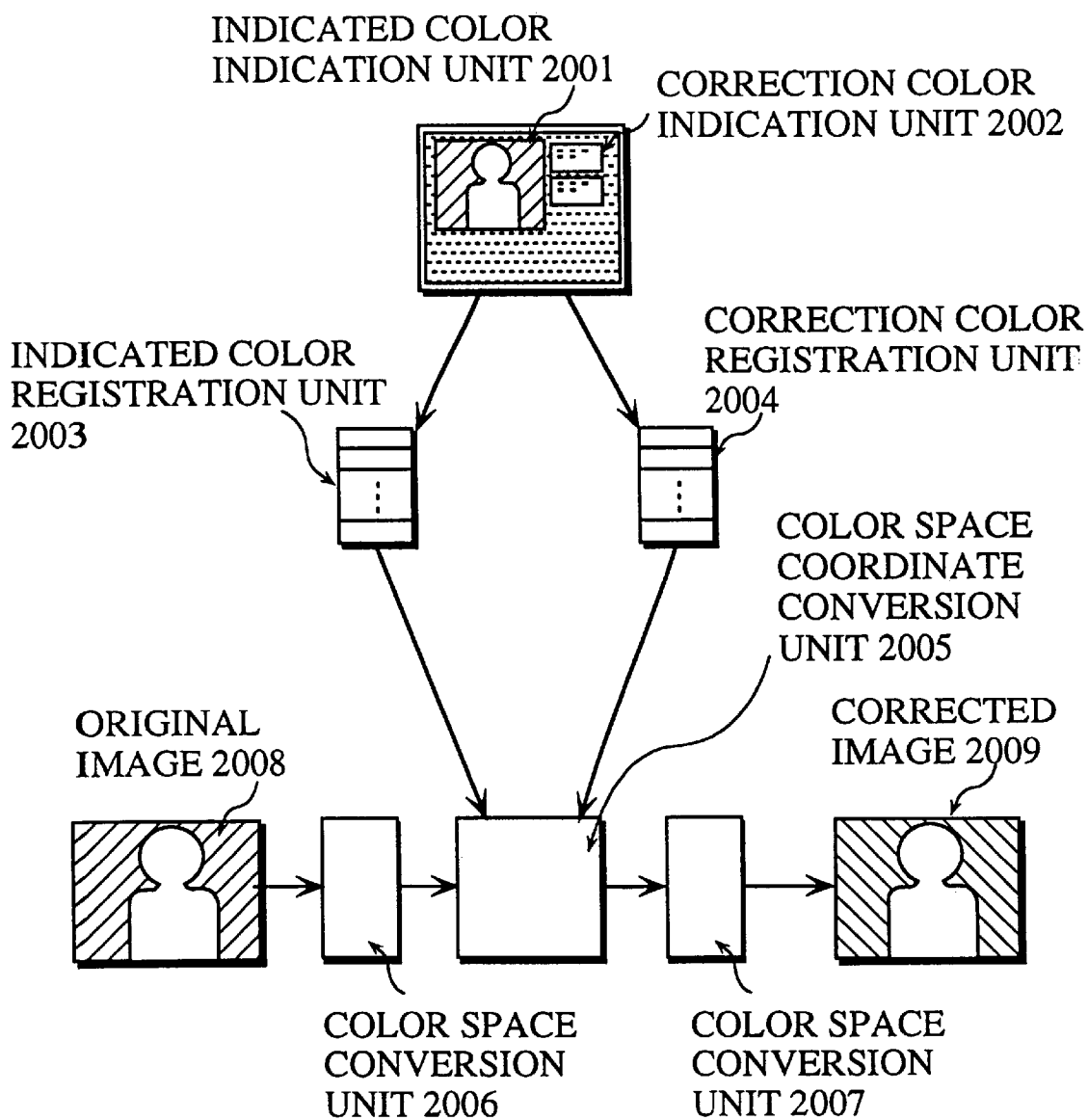
FIG. 20 shows the entire construction of the color correction device in the third embodiment of the present invention.

FIG. 20 shows the entire construction of the color correction device of the third embodiment of the present invention. In this drawing, the color correction device can be seen to include an indicated color indication unit 2001, a correction color indication unit 2002, an indicated color registration unit 2003, a correction color registration unit 2004, a color space coordinate conversion unit 2005, and two color space conversion units 2006 and 2007.

Here, in FIG. 20, original image 2008 is the image data which is inputted into the present device before correction, while corrected image 2009 is the image data which is outputted by the present device after correction. This image data is defined on an RGB color space suited to display by a CRT, with each of the three colors red, green and blue being defined by 8 bits of data, so that the image data is made up of sets of 24-bit data.

The coordinates in the color space of the color indicated by the indicated color indication unit 2001 are registered in the indicated color registration unit 2003. In the same way, the coordinates of the correction color indicated by the correction color indication unit 2002 are registered in the correction color registration unit 2004. Here, the construction and operation of the indicated color indication unit 2001 and the correction color indication unit 2002 are fundamentally the same as those described in the first embodiment.

The color space coordinate conversion unit 2005 uses the coordinates of the inputted indication point inputted into the indicated color registration unit 2003 and the coordinates of the correction color registered in the correction color registration unit 2004 to map the coordinates of the pixels of the inputted original image 2008 in the color space, before outputting the coordinates after mapping as the pixel information of the corrected image 2009.

Figure 21:
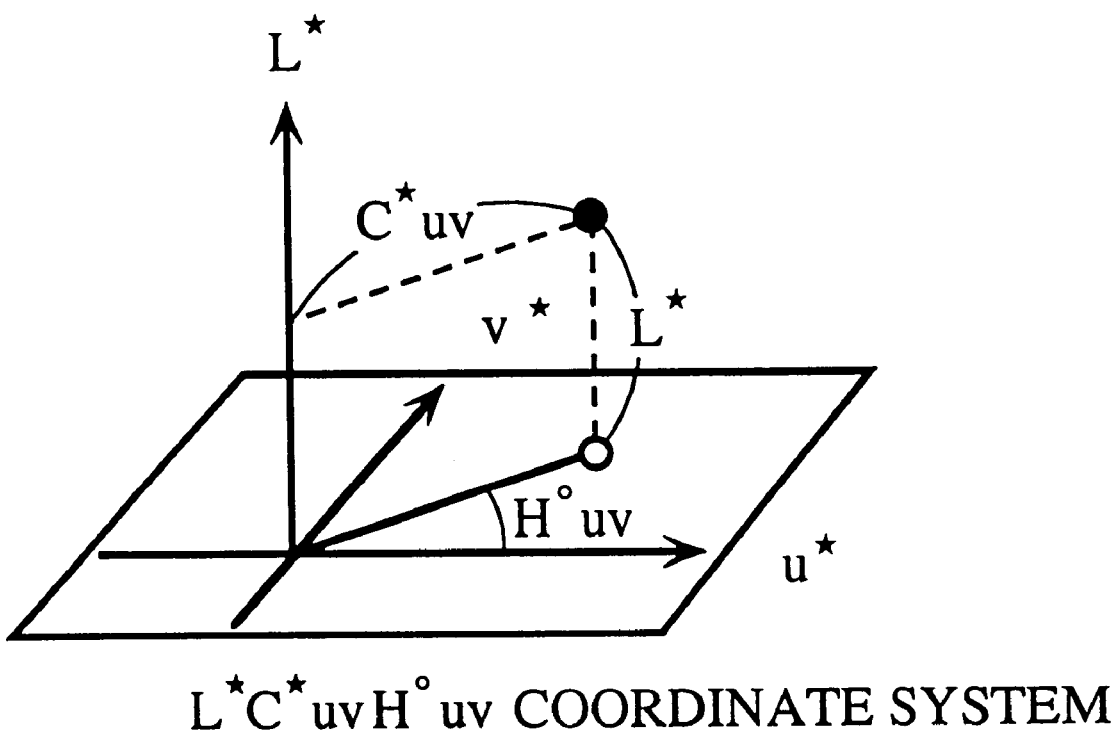
FIG. 21 shows a conception figure of the L*C*uvHuv coordinate system in the third embodiment of the present invention.

The following is an explanation of the operation of the color space conversion units 2006 and 2007 in the present embodiment. The colors in the original image which is to be subject to color correction are defined in general by a three-dimensional color space. However, there are a number of different kinds of color space which are used out of convenience during display, storage, transmission and adjustment, so that the kind of color space defined by the original data and the kind of color space suited to color space coordinate conversion by the color space coordinate conversion unit 2005 will not necessarily be the same. Since in the present embodiment, the concept of the presence of the three visible attributes of color, namely lightness, chroma and hue is suited to color spare coordinate conversion, color space coordinate conversion is executed in the present embodiment using a polar coordinate system defined as a CIE-LUV space and an L*(metric Lightness) C*uv(metric Chroma) Huv(metric Hue angle) coordinate system, such a system being illustrated in FIG. 21.

Since in the present embodiment, color space coordinate conversion is executed for an L*C*uvHuv coordinate system, the conversion from RGB to L*C*uvHuv is performed by the color space conversion unit 2006, while the conversion from L*C*uvHuv to RGB is performed by the color space conversion unit 2007.

The following is a description of the determination of the function used by the color space coordinate conversion unit 2005.

Figure 22:
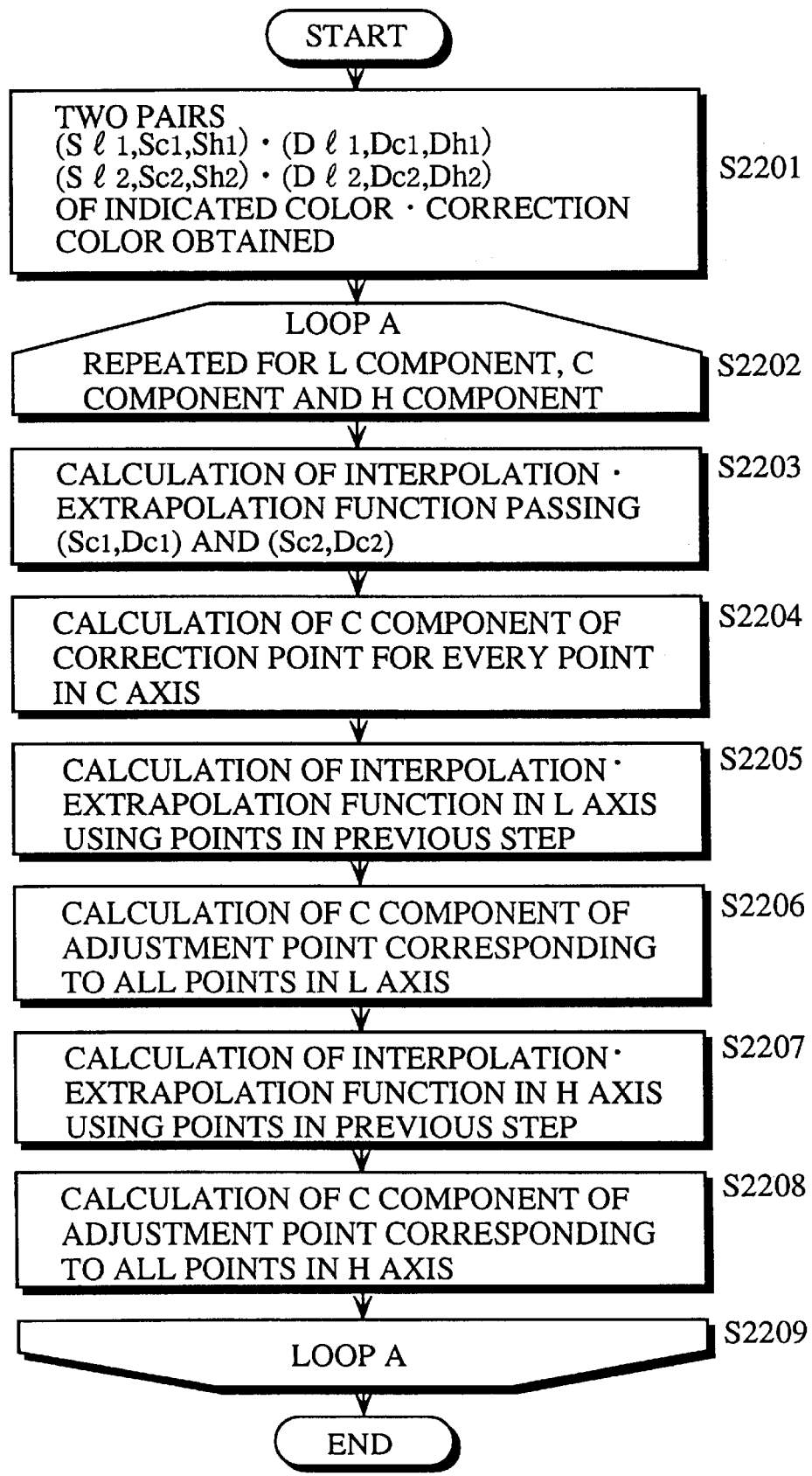
FIG. 22 is a flowchart for the operation of the color correction device in the third embodiment of the present invention.

In the present embodiment, it is supposed that two pairs of indicated color.correction color have been indicated, with FIG. 22 showing the flowchart for the function determination procedure under this premise.

For the present device, once the coordinates for the two pairs of indicated color.correction color have been registered in the coordinate registration unit 2003 and in the correction color registration unit 2004, respectively (Step S2201), then, based on these coordinates, the color space coordinate conversion unit 2005 determines said function, using a fixed interpolation--extrapolation calculation (Steps S2202–S2209). Here, the two pairs of indicated color.correction color are set as $(S_{l1}, S_{c1}, S_{h1})$. $(D_{l1}, D_{c1}, D_{h1})$ and $(S_{l2}, S_{c2}, S_{h2}).(D_{l2}, D_{c2}, D_{h2})$.

Figure 23A:
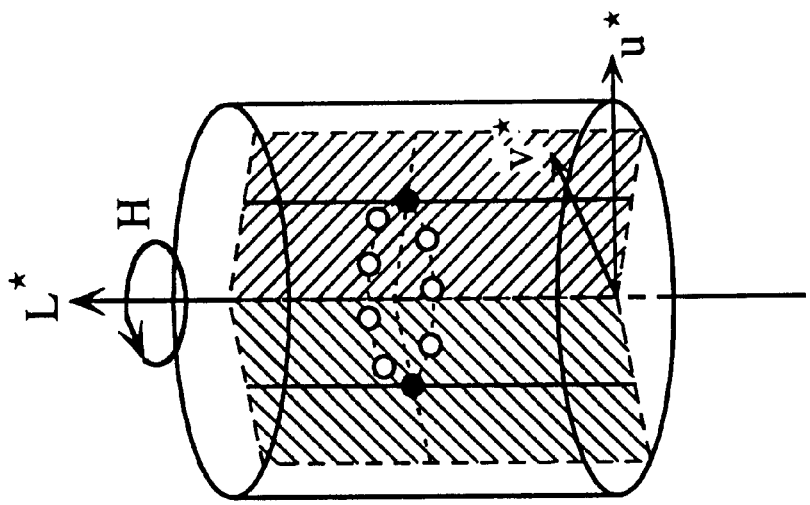
FIG. 23A shows a conception figure for the data processing for the interpolation-extrapolation calculation in the C direction in the third embodiment of the present invention.
Figure 23B:
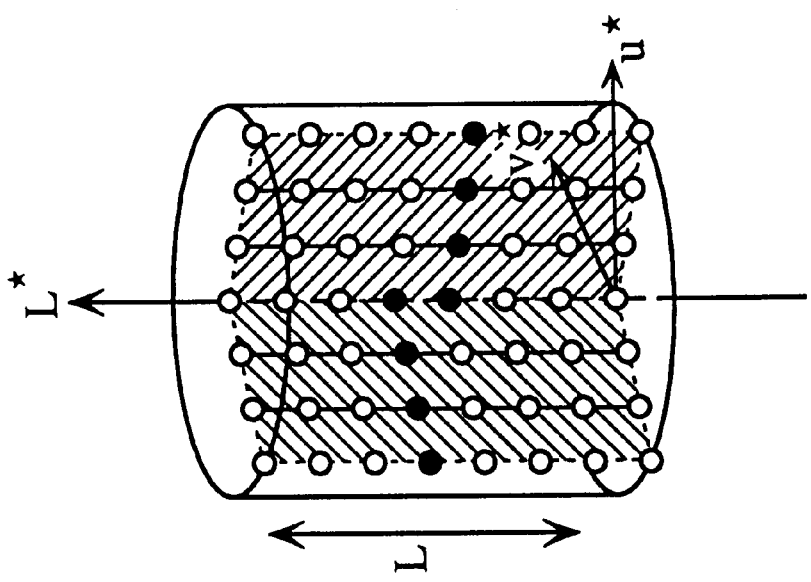
FIG. 23B shows a conception figure for the data processing for the interpolation-extrapolation calculation in the L direction in the third embodiment of the present invention.
Figure 23C:
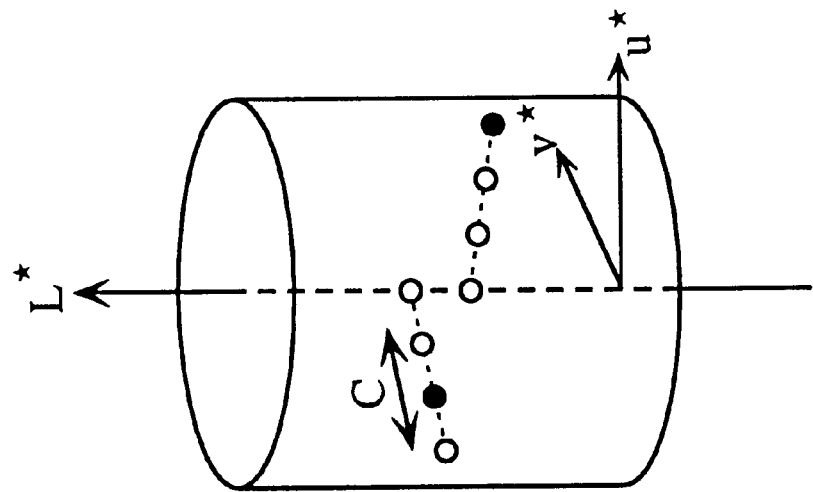
FIG. 23C shows a conception figure for the data processing for the interpolation-extrapolation calculation in the H direction in the third embodiment of the present invention.

FIGS. 23A–23C are drawings showing the colors to be subjected to the interpolation-extrapolation calculation in the L*C*uvHuv coordinate system (FIG. 23A shows the colors to be subjected to the interpolation-extrapolation calculation in the C axis, FIG. 23B shows the colors to be subjected to the interpolation-extrapolation calculation in the L axis and FIG. 23C shows the colors to be subjected to the interpolation-extrapolation calculation in the H axis).

Here, the determination of said function refers to the calculation of points after color correction for all of the points in the LCH coordinate system, or in other words the calculation of the coordinates of the correction points. The coordinates of the correction points are calculated by the color space coordinate conversion unit 2005 successively or in parallel as the lightness L* (hereinafter, "L") component, chroma C*uv (hereinafter, "C") component, and the hue Huv (hereinafter, "H") component (Steps S2202–S2209), although only the explanation here will only touch upon the C component (Steps S2202–S2208).

As shown in FIG. 23A, once given the two indicated points $(S_{l1}, S_{c1}, S_{h1})$ and $(S_{l2}, S_{c2}, S_{h2})$ shown as black dots, then interpolation-extrapolation in the C direction of the LCH coordinate system is calculated, as shown by the arrows in FIG. 23A, for the C component $D_{c1}$, $D_{c2}$ of the correction point coordinates corresponding to the indicated points (Steps S2203, S2204). More specifically, an interpolation-extrapolation function which passes through both points $(S_{c1}, D_{c1})$ and $(S_{c2}, D_{c2})$, in other words, a straight line in two dimensions, is calculated (Step S2203), before the C component values of the coordinates of the correction points corresponding to all of the points which can be taken in the C axis (these points being shown by white dots in FIG. 23A) are calculated using this straight line (Step S2204). These calculated points are shown as the black dots in FIG. 23B.

In the same way, the C components of the coordinates of the correction points corresponding to all of the black dots calculated in Step S2204 are used as shown by the arrows in FIG. 23B to perform a calculation of interpolation-extrapolation in the L direction (Steps S2205, S2206). More specifically, two points which have a same C component value out of these black dots are taken and a straight line which passes the L component values of these dot and the C component values of the correction points corresponding to these points is calculated (Step S2205). This straight line is then used to calculate the C component values of the correction points corresponding to all of the points on the L axis whose C component value is the same (Step S2206). As a result, the C components of the correction point coordinates corresponding to all of the white dots in FIG. 23B, which is to say all of the white dots on the two surfaces, can be found.

Finally, the C components of the correction point coordinates corresponding to all of the points calculated in Step S2206 are used as shown by the arrows in FIG. 23C to perform a calculation of interpolation in the H direction (Steps S2207, S2208). More specifically, two points which have a same C component value and a same L component value out of the points in FIG. 23B are taken and a straight line which passes the H component values of these dots and the C component values of the correction points corresponding to these points is calculated (Step S2207). This straight line is then used to calculate the C component values of the correction points corresponding to all of the points (shown in FIG. 23C as white dots) on the H axis whose C component value and L component value are the same (Step S2208).

By means of the above process (Steps S 2203–S2208) the C component values of the coordinates of the correction points corresponding to every point in the LCH space are decided.

Following this, by performing the same calculation for the L component values and the H component values, the coordinates of the correction point corresponding to any arbitrary point in the LCH space can be found (Steps S2203–S2209).

By using the coordinates of a correction point corresponding to any arbitrary point in the LCH space determined as described above as a function for mapping, the color space coordinate conversion unit 2005 executes color correction. That is to say, once the pixels in the original image 2008 which are defined in an RGB space have been converted by the color space conversion unit 2006 into coordinates in the LCH space, they are converted into corresponding correction point coordinates by the color space coordinate conversion unit 2005, before being changed back into values in an RGB space by the color space conversion unit 2007 and being outputted as pixel values in the corrected image 2009.

As described above, by means of the present embodiment using an interpolation-extrapolation calculation, the color correction of any arbitrary point in the LCH space can be executed. Accordingly, color correction for all of the colors in the LCH space can be executed with full protection of the relationships such as lightness, chroma and hue, regardless of the number of pairs of indicated color.correction color which are set as the standards for color correction. In this way, the user is able to quickly achieve a desired color correction.

It should be noted here that in the description of the present embodiment, a straight line was used as the function for interpolation and extrapolation because two points were indicated, although the present embodiment should not be construed as being limited to such. For example, when performing interpolation and extrapolation for three or more points, a curve which passes these three or more points may be calculated using a spline function, with interpolation and extrapolation then being performed using this curve.

Also, in the present embodiment, the interpolation-extrapolation calculation is described as being executed in the order C, L, then H, although the same results can still be expected if the calculation is performed in L, C, H order, or for that matter in any other order.

Finally, it also should be noted that although in the present embodiment the original image 2008 and the corrected image 2009 are made up of pixels which are composed of a total of 24 bits per pixel in the RGB space, no matter what the dimensions of the pixel data in the color space are, the same results can be expected whether the number of bits expressing the pixel data is greater or lower than 24. Also, whilst an L*C*uvHuv coordinate system is described as being used as the coordinate system for executing color correction in the present embodiment, the same results can be expected regardless of the coordinate system used, even if the device does not include color space conversion units 2006 and 2007 and the coordinate system of the inputted image data is used as it is.

Fourth Embodiment

The following is an explanation of the fourth embodiment of the present invention with reference to the drawings. This embodiment is characterized by being able to eliminate the problems which can occur for the device of the third embodiment when the distance between indicated colors is small.

The entire construction of the fourth embodiment is the same as the construction for the third embodiment shown in FIG. 20. The difference with the third embodiment is that the color space coordinate conversion unit 2005 is provided with an interpolation-extrapolation calculation procedure, so that the explanation in this embodiment will concentrate on only the details of the operation of the interpolation-extrapolation calculation.

The following is an explanation of the operation of the color correction device constructed as described above, with reference to FIGS. 24, 25A and 25B.

Figure 24:
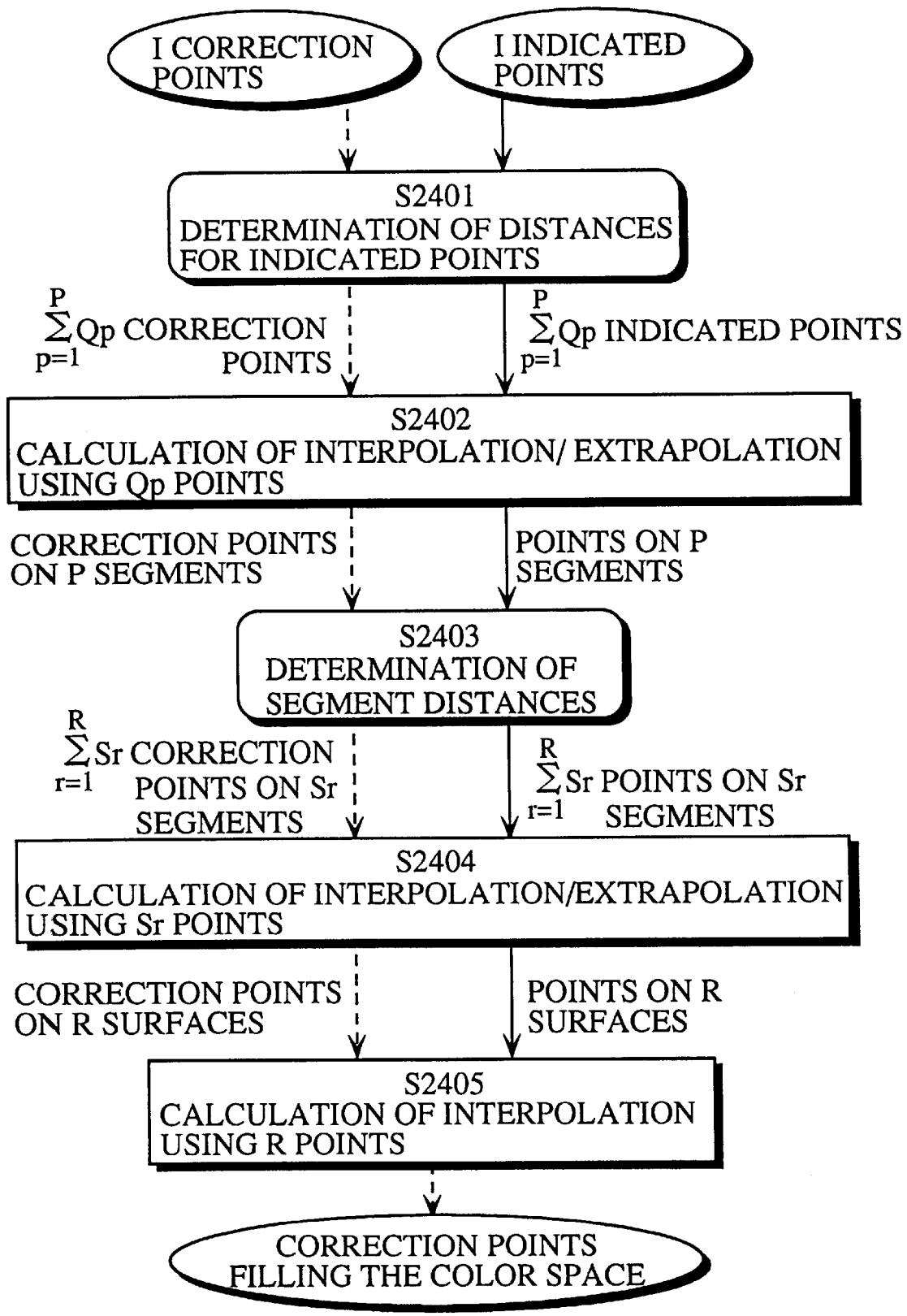
FIG. 24 is a flowchart for the procedure for the interpolation-extrapolation calculation of the distances between indicated points in the fourth embodiment of the present invention.

FIG. 24 is a flowchart showing the interpolation-extrapolation calculation procedure. The steps for determining the distances between pairs of indicated points are shown as S2401 and S2403, while steps S2402, S2404 and S2405 are the steps for finding the L component, the C component and the H component of the coordinates of all correction points using interpolation and extrapolation calculations.

Figure 25B:
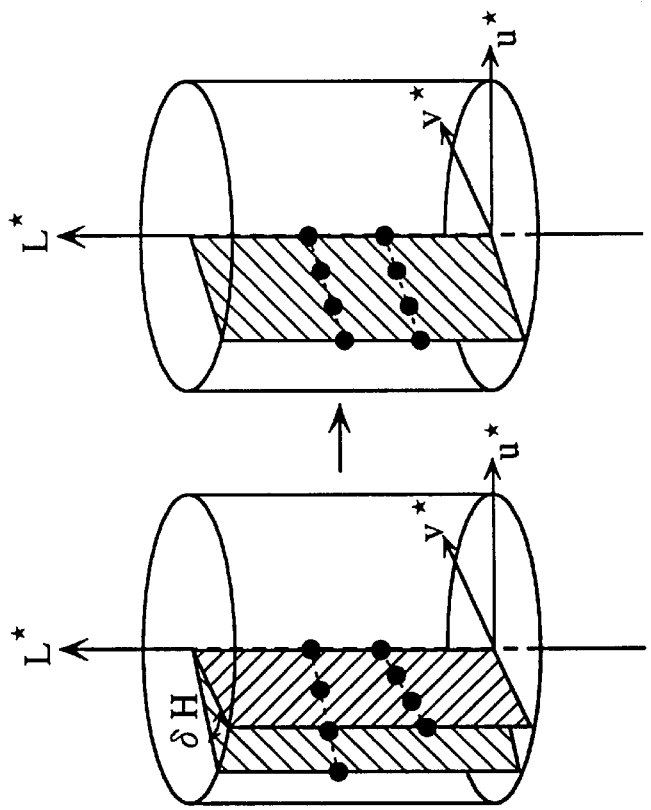
FIG. 25B shows conception figures for the data processing for the interpolation-extrapolation calculation in the L direction in the fourth embodiment of the present invention.
Figure 25A:
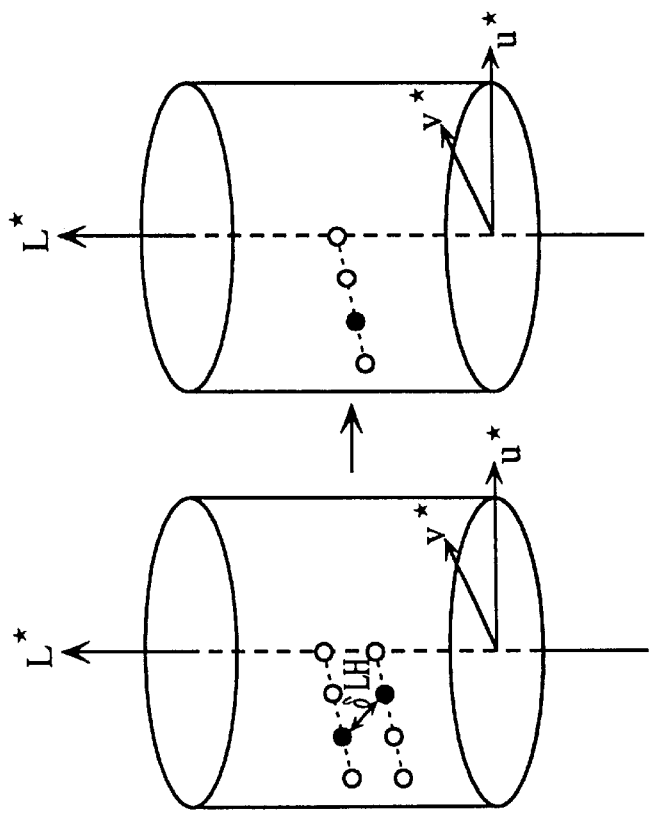
FIG. 25A shows conception figures for the data processing for the interpolation-extrapolation calculation in the C direction in the fourth embodiment of the present invention.

FIGS. 25A and 25B are conception figures relating to the determination of each component of the coordinates of the correction points in the present embodiment.

In reality, the L component, C component and H component of the actual coordinates of the correction points are calculated in parallel, although only the explanation here will only touch upon the calculation of the C component.

Once I indication points and the coordinates for the correction points corresponding to such indicated points have been inputted, then the distance in the L direction and in the H direction of the LCH coordinate system between arbitrary pairs of indicated points is measured by the color space coordinate conversion unit 2005 (Step S2401). When the distance in each direction is below a given threshold value δLH, the pair of indicated points is set in a same group.

Here, if there are a total of P pairs of groups p each of which contains a number Qp of elements, then the color space coordinate conversion unit 2005 uses the C component of the correction point coordinates of Qp points for each group p, and performs interpolation and extrapolation for the Qp points in the C direction (Step S2402). In doing so, the L and H components in the coordinates of the Qp indicated points are converted to a value which reflects a mean value in each axis. In this way the C component of the coordinates for correction points corresponding to any arbitrary point on the P segments in the LCH coordinate system is determined. In FIG. 25A, a conception figure for when I=2 and distance for the indicated points is below a threshold value δLH is shown.

Following this, once the P segments given by the above process are inputted, the color space coordinate conversion unit 2005 measures the distances in the H direction of the LCH coordinate system between pairs of segments for any arbitrary segment (Step S2403). When a distance is below a given threshold value δH, the pair of indicated segments is set in a same group.

Here, if there are a total of R pairs of groups r each of which contains a number Sr of elements, then the color space coordinate conversion unit 2005 uses the C component of the correction point coordinates of Sr segments for each group r, and performs interpolation and extrapolation in the L direction (Step S2404). In doing so, the H components in the coordinates of the points on the Sr segments are converted to a value which reflects a mean value. In this way, the C component of coordinates for the correction point corresponding to any arbitrary point on the surfaces R in the LCH coordinate system is determined. In FIG. 25B, a conception figure of when R=2 and distance between the indicated segments is below a threshold value δH is shown.

Finally, the color space coordinate conversion unit 2005 uses the C component of the coordinates of the corrected points in the LCH coordinate system corresponding to points on the R surfaces and performs interpolation in the R direction (Step S2405). In this way the C component of the coordinates of the corrected points corresponding to any point in the LCH coordinate system is decided.

Following the above process, the same calculation is performed for the L component and the H component, so that the coordinates of a correction point corresponding to any arbitrary point in the LCH coordinate system can be found.

In the present embodiment described above, by switching between interpolation and extrapolation procedures depending on the distances between a number of indicated points in an LCH coordinate system, then a color correction device which can perform color correction with little unnatural coloring can be achieved, even when a number of points which have proximate indicated points are indicated.

It should be noted here that in the present embodiment, the interpolation-extrapolation calculation is described as being executed in the order C, L, then H, although the same results can still be expected if the calculation is performed in L, C, H order, or for that matter in any other order.

Fifth Embodiment

The following is an explanation of the fifth embodiment of the present invention with reference to the drawings. This embodiment is characterized by already including a table of points (hereinafter, Look Up Table (LUT)) after correction corresponding to fixed points in the color space.

Figure 26:
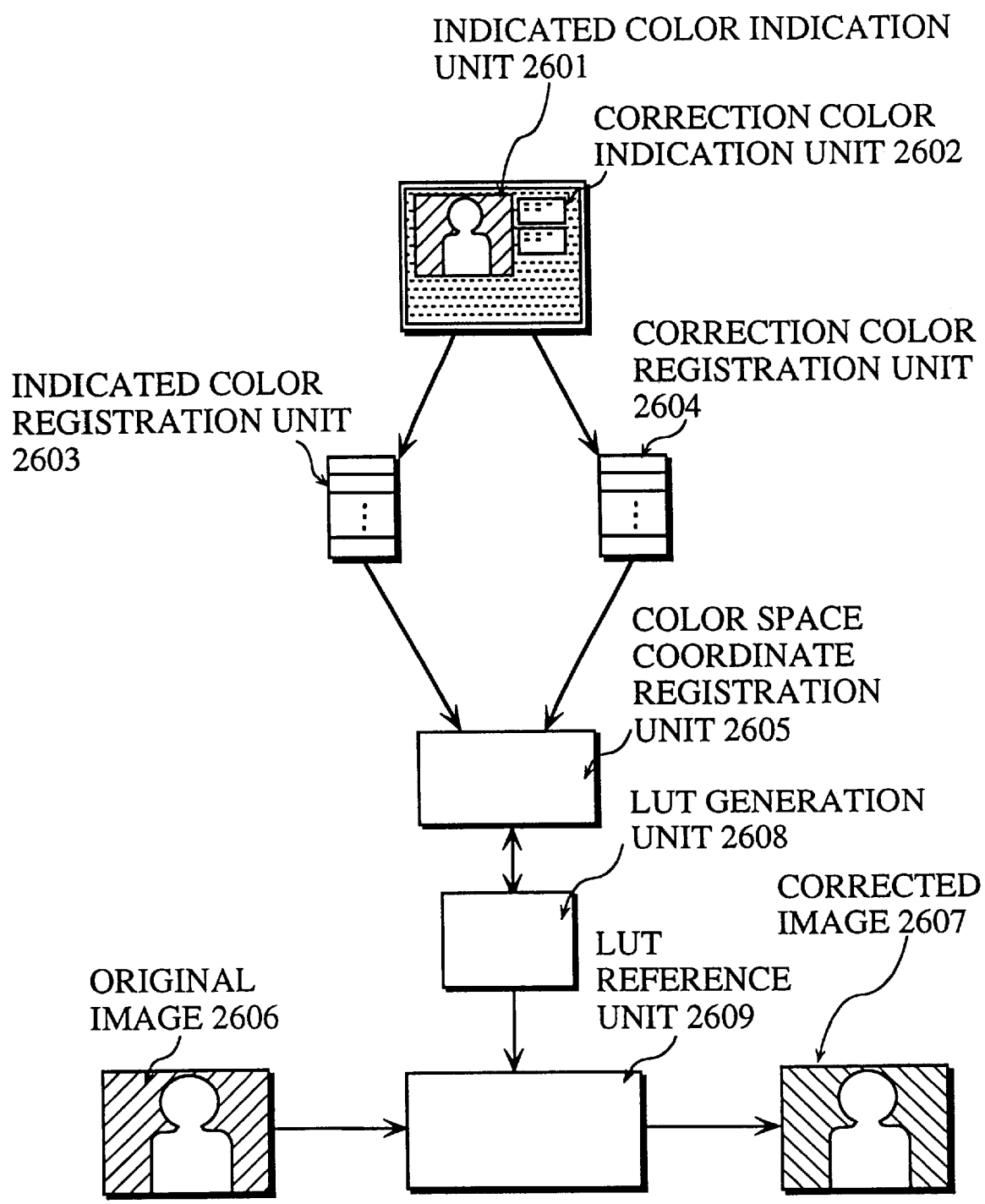
FIG. 26 shows the entire construction of the color correction device in the fifth embodiment of the present invention.

FIG. 26 shows the entire construction of the color correction device of the fifth embodiment of the present invention. In this drawing, the color correction device can be seen to include an indicated color indication unit 2601, a correction color indication unit 2602, an indicated color registration unit 2603, a correction color registration unit 2604, a color space coordinate conversion unit 2605, an original image 2606, a corrected image 2607, an LUT generation unit 2608 and an LUT reference unit 2609. In FIG. 26, the original image 2606 is the image data which is inputted into the present device before correction, while the corrected image 2607 is the image data which is outputted by the present device after correction.

The coordinates in the color space of the color indicated by the indicated color indication unit 2601 are registered in the indicated color registration unit 2603. In the same way, the coordinates of the correction color indicated by the correction color indication unit 2602 are registered in the correction color registration unit 2604. Here, the construction and operation of the indicated color indication unit 2601 and the correction color indication unit 2602 are fundamentally the same as those described in the first embodiment.

The color space coordinate conversion unit 2605 uses the coordinates of the inputted indication point inputted into the indicated color registration unit 2603 and the coordinates of the correction color registered in the correction color registration unit 2604 to determine a function, and maps the coordinates from the LUT generation unit 2608 in the color space, before returning the data to the LUT generation unit 2608 as LUT data.

The LUT data generated by the LUT generation unit 2608 is then outputted to the LUT reference unit 2609.

By referring to the LUT data generated by the LUT generation unit 2608, the LUT reference unit 2609 maps the coordinates of the pixels of the original image 2606 in the color space, before outputting the coordinates after correction as the pixel information for the corrected image 2607.

Since the differences between the construction of the present embodiment and the third and fourth embodiments of the present invention lie in the color space coordinate conversion unit 2605, the LUT generation unit 2608 and the LUT reference unit 2609, no explanation of the indicated color indication unit 2601, the correction color indication unit 2602, the indicated color registration unit 2603, the correction color registration unit 2604, the original image 2606, or the corrected image 2607 will be given.

The LUT generation unit 2608 takes the coordinates of the lattice points (described below) in the RGB color space in which the original image 2606 and the corrected image 2607 are defined and, after converting them into coordinates in an LCH coordinate system for processing by the color space coordinate conversion unit 2605, outputs the coordinates to the color space coordinate conversion unit 2605. The LUT generation unit 2608 then converts the mapped output of the color space coordinate conversion unit 2605 into coordinates in an RGB color space and outputs the converted data as LUT data to the LUT reference unit 2609.

The LUT reference unit 2609 takes the coordinates in the color space of the pixels of the inputted original image 2906 and, referring to the LUT data generated by the LUT generation unit 2608, outputs the coordinates as pixel information for the corrected image 2607.

Here, the LUT may have values which correspond to all of the inputted values for the RGB space, but in such a case the size of the LUT for RGB data wherein each color is defined by 8 bits will be 256*256*256*3=50,331,648 bytes which would make the load of the LUT reference unit 2609 very substantial. In this respect, providing the LUT reference unit 2609 with an interpolation processing function can reduce the size of the LUT to several kilobytes.

The composition of the LUT is split into 8 levels in each of the axes in the RGB color space so that there is a cube with a total of 512 ($8^3$) lattice points, with there also being 729 output values which correspond to the input colors at the lattice points. For the LUT reference unit 2609, interpolation calculation is performed using the closest six points of data for the vertex of a triangular prism surrounding an input value out of the 729 lattice points for the LUT, thereby determining the output values.

Here, the details of the LUT and the method of interpolation calculation by the LUT reference unit 2609 are as taught by the reference "Fast color processor with programmable interpolation by small memory (PRISM):Journal of Electronic Imaging, Jul. 1993, Vol. 2(3), p 213–p224".

As described above, the present embodiment converts the original image 2606 to the desired corrected image 2607 by means of a high-speed process using an LUT and, since only a reference of an LUT is executed, the whole color correction process becomes very fast, with the processing speed also becoming constant due to not relying on an equation which contains a function of the number of indicated points or mapping, so that processing of images can easily be achieved.

Furthermore, this embodiment does not require the color space conversion units which were necessary in the third and fourth embodiments. This is because the LUT already has a value for an RGB output corresponding to an RGB input, so that a color space conversion process is included in the processing by the LUT generation unit 2608 during LUT generation. Also, since the internal part of the color correction unit of the present embodiment executes interpolation calculation using values for the six closest points in the LUT surrounding the inputted value, a great reduction in the amount of LUT data can be achieved.

It should be noted that in the present embodiment, the LUT was described as having 729 values, although the same results can be expected if this number is set lower than the stated value provided it falls within a range which allows for output errors, or if the number is set greater than the stated figure provided it falls within a range for which processing by the LUT reference unit 2609 is possible.

In the same way, the interpolation calculation of the LUT reference unit 2609 was described as using the values of the six closest points surrounding the inputted pixel value, although the same results can be expected if the number of values used in the interpolation calculation and the method selecting the values uses a closest 4 values or 8 values.

Sixth Embodiment

The following is an explanation of the sixth embodiment of the present invention, with reference to the drawings. This embodiment is characterized by including a high-speed cache memory for correction.

Figure 27:
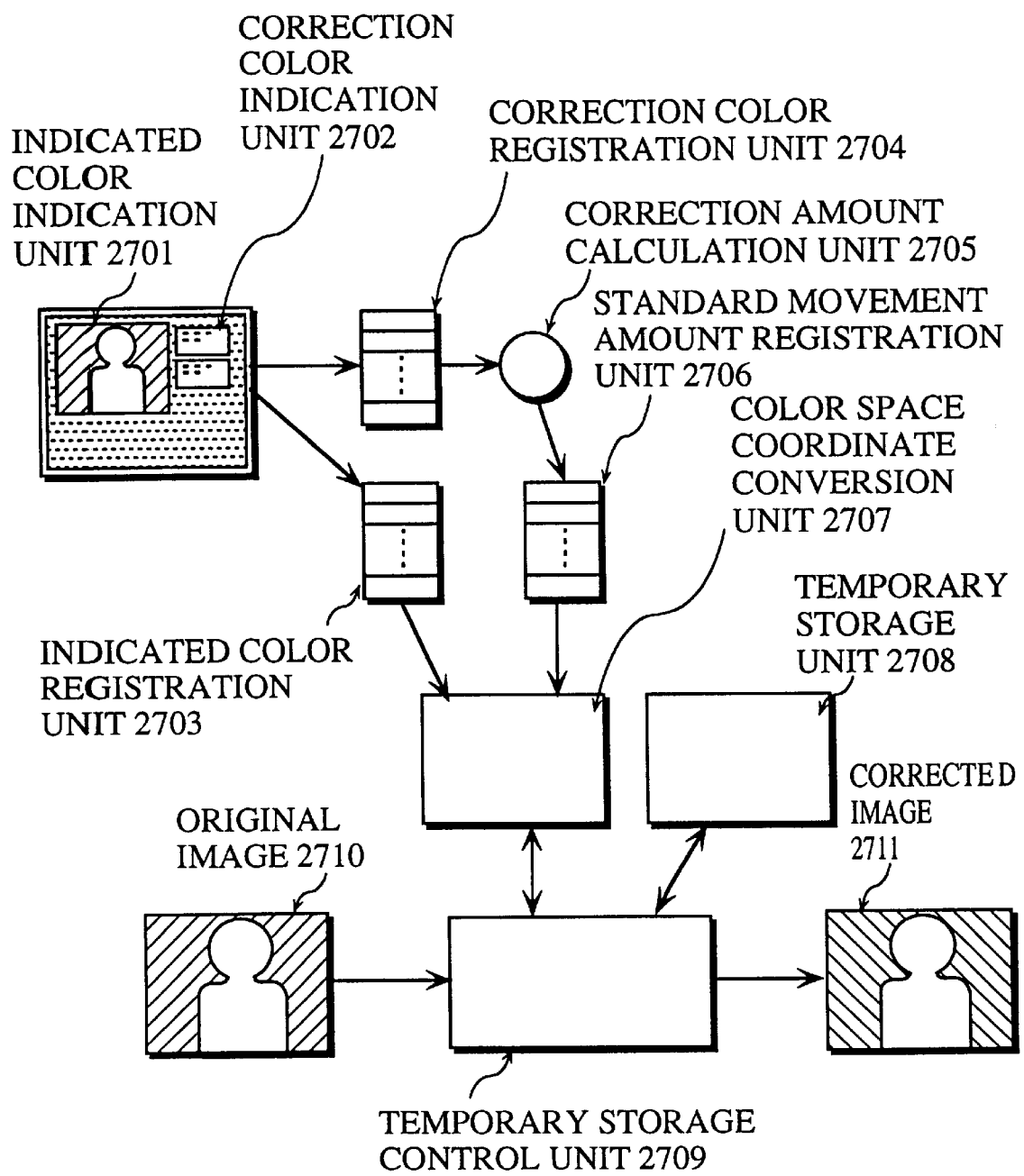
FIG. 27 shows the entire construction of the color correction device in the sixth embodiment of the present invention.

FIG. 27 shows the entire construction of the color correction device of the sixth embodiment of the present invention. In this drawing, the color correction device can be seen to include an indicated color indication unit 2701, a correction color indication unit 2702, an indicated color registration unit 2703, a correction color registration unit 2704, a correction amount calculation unit 2705, a standard movement amount registration unit 2706, a color space coordinate conversion unit 2707, a temporary storage unit 2708, and a temporary storage control unit 2709. Here, the indicated color indication unit 2701, the correction color indication unit 2702, the indicated color registration unit 2703, the correction color registration unit 2704, the correction amount calculation unit 2705, the standard movement amount registration unit 2706, and the color space coordinate conversion unit 2707 have fundamentally the same construction and operation as the corresponding elements in the first embodiment. Also, in FIG. 27, the original image 2710 is the image data which is inputted into the present device before correction, while the corrected image 2711 is the image data which is outputted by the present device after correction.

The coordinates in the color space of the color selected by the user operating the indicated color indication unit 2701 are registered in the indicated color registration unit 2703. In the same way, the coordinates of the correction color selected by the correction color indication unit 2702 are registered in the correction color registration unit 2704.

The correction amount calculation unit 2705 calculates a corresponding movement amount from the coordinates registered in the indicated color registration unit 2703 and the coordinates for the correction color registered in the correction color registration unit 2704, before registering the result in the standard movement amount registration unit 2706.

Once the coordinates in the color space of the pixels in the original image 2710 have been inputted, the temporary storage control unit 2709 investigates the stored contents of the temporary storage unit 2708 and checks whether there are stored coordinates which match the inputted coordinates.

When stored coordinates which match the coordinates inputted into the temporary storage unit 2708 are found, the output coordinates corresponding to the input coordinates registered in the temporary storage unit 2708 are outputted. On the other hand, when there are no stored input coordinates which match the coordinates inputted into the temporary storage unit 2708, the input coordinates are passed over to the color space coordinate conversion unit 2707.

The color space coordinate conversion unit 2707 uses the coordinates registered in the indicated color registration unit 2703 and the movement amount registered in the standard movement amount registration unit 2706 to determine the mapping function for the color space, maps the input coordinates selected by the temporary storage control unit 2709 and passes over the results to the temporary storage control unit 2709.

The temporary storage control unit 2709 receives the output result of the color space coordinate conversion unit 2707. It registers the inputted coordinates together with the corresponding output result from the color space coordinate conversion unit 2707 in the temporary storage unit 2708 and outputs the data as the pixel values of the corrected image 2711. At this point, if there is no recording space left in the temporary storage unit 2708 for new registration, the temporary storage control unit 2709 deletes coordinates registered in the temporary storage unit 270 according to a renewal policy and then registers the new coordinates.

This renewal policy can be thought of as being the random selection of coordinates stored in the temporary storage unit 2708, their deletion and the registration of new coordinates, or alternatively as being the selection of the coordinates with a lowest number of references, their deletion and the registration of new coordinates, or as the selection of the coordinates using a LRU policy, their deletion and the registration of new coordinates, or as any combination of these methods.

The following is an explanation of the operation of the temporary storage unit 2708 and the temporary storage control unit 2709 in the present embodiment. In this explanation, the operation will be described as using to a YUV space as the color space.

Figure 28:
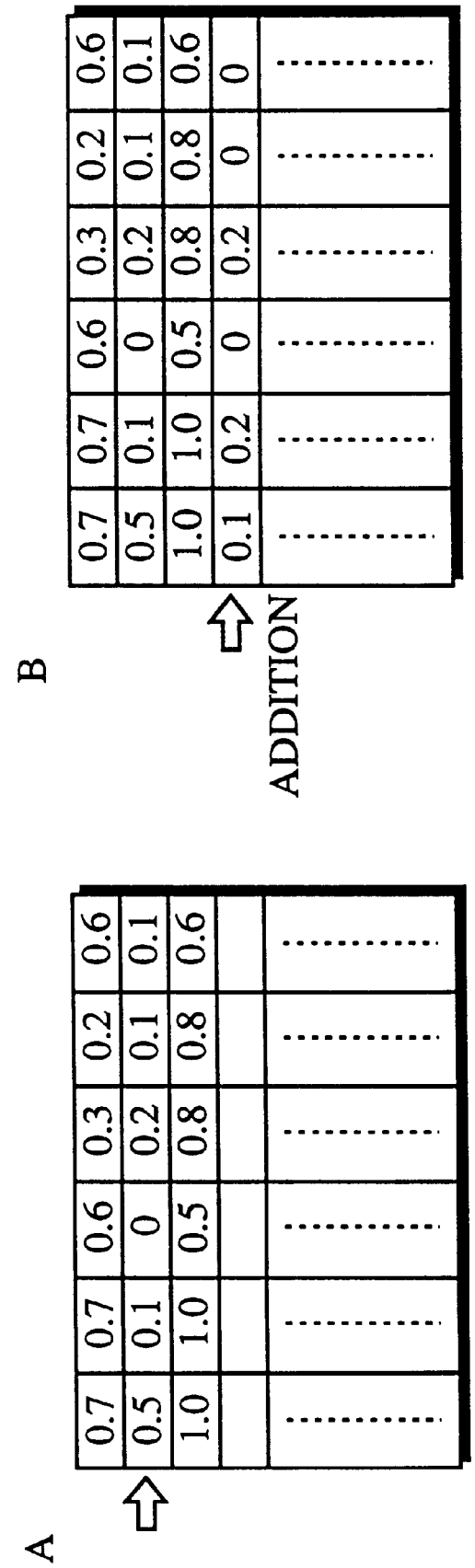
FIG. 28A shows an example of the information registered in the temporary storage unit in the sixth embodiment of the present invention.
FIG. 28B shows an example of when the information is supplemented and stored in the temporary storage unit in the sixth embodiment of the present invention.

A number of sets of input coordinates and output coordinates are registered in the temporary storage unit 2708 as shown in FIG. 28A. Once again, the coordinates in the YUV space are expressed as (Y,U,V). When the coordinates (0.5, 0.1, 0) of a pixel in the original image 2710 have been inputted into the temporary storage control unit 2709, then the temporary storage control unit 2709 searches for a same set of coordinates out of the input coordinates registered in the temporary storage unit 2708. When coordinates such as those shown in FIG. 28A are stored in the temporary storage unit 2708, then since there are coordinates in the temporary storage unit 2708 which correspond to the inputted coordinates (0.5, 0.1, 0), the output coordinates (0.2, 0.1, 0.1) corresponding to these input coordinates are retrieved and are outputted as the pixel values of the corrected image 2711 corresponding to a pixel in the original image 2710.

Next, the explanation will focus on the case when (0.1, 0.2, 0) are inputted as the coordinates of a pixel in the corrected image 2710. Here, if the coordinates registered in the temporary storage unit 2708 are as shown in FIG. 22A, then since the coordinates (0.1, 0.2, 0) are not registered in the temporary storage unit 2708, the inputted coordinates are passed over to the color space coordinate conversion unit 2707 by the temporary storage control unit 2709.

The color space coordinate conversion unit 2707 performs mapping using the information stored in the indicated color registration unit 2703 and in the movement amount registration unit 2704, with (0.2, 0, 0) being outputted as the coordinates.

The temporary storage control unit 2709 outputs (0.2, 0, 0) as pixel values of the corrected image as well as registering the pair of input value coordinates (0.1, 0.2, 0) and output value coordinates (0.2, 0, 0) in the temporary storage unit 2708 (FIG. 22B).

For the present device described above, the use of a temporary storage unit 2708 and a temporary storage control unit 2709 allows a reduction in calculation time necessary for mapping the coordinates by the color space coordinate conversion unit 2707, thereby enabling high speed color correction of the original image 2710.

It should be noted here that as with the other embodiments, the same processing results can be expected if, instead of using a YUV space, a uniform color space CIE-LUV space, an HSV space, HLS space, or RGB space which are widely used by computers, or the like is used as a color space.

Also, the temporary storage unit may be split into blocks. Here, the storage areas may be divided in respect to the values of the coordinates. By doing so, the processing will be faster than when a large temporary storage unit is treated as being one block. In such an arrangement, it is possible for the size of the blocks to be dynamically changed in response to data input.

Seventh Embodiment

The following is an explanation of the seventh embodiment of the present invention, with reference to the drawings. This embodiment relates specifically to the indicated color indication unit and the correction color indication unit in the devices of the first through sixth embodiments and can therefore be adapted to use by the devices in any of the first through sixth embodiments.

Here, FIG. 8 will be used as a figure showing the entire construction of the present embodiment.

The following is a detailed explanation of the indicated color indication unit 801 and the correction color indication unit 802 in the seventh embodiment of the present invention, with reference to the drawings. Here, both 801 and 802 will be referred to as the color indication unit.

The color indication unit is more specifically composed of a color CRT, a pointing device such as a mouse, and a CPU for running a control program for realizing a graphical user interface.

Figure 29:
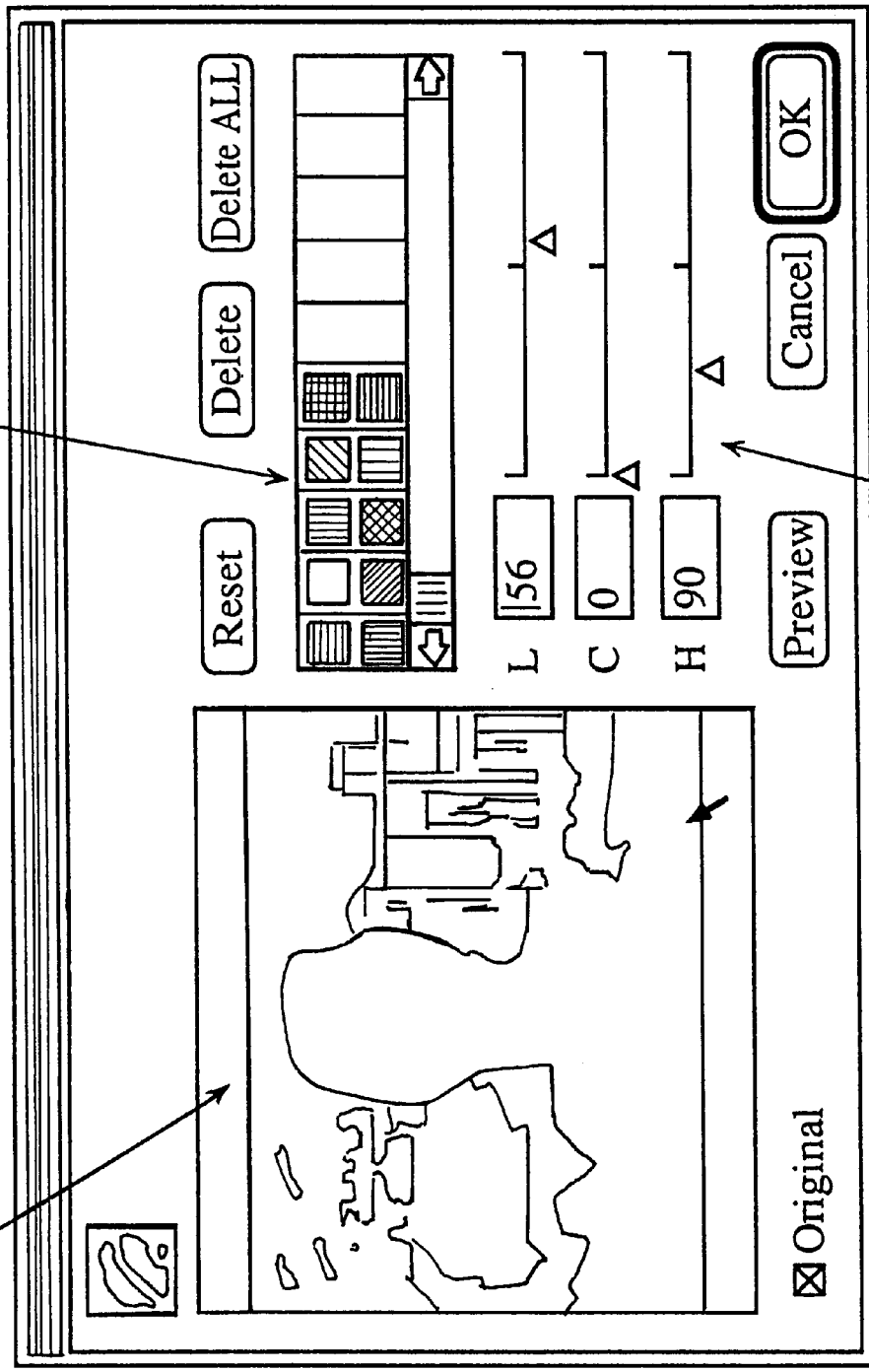
FIG. 29 shows the user interface displayed by the CRT of the color correction device in the seventh embodiment of the present invention.

FIG. 29 shows the graphical user interface displayed on the CRT by the color indication unit. As shown in FIG. 29, the user interface is composed so as be in only one window and includes an input/output image display unit 2901, an indicated color/correction color correction unit 2902, a correction color editing unit 2903 and a number of operation buttons.

Figure 30:
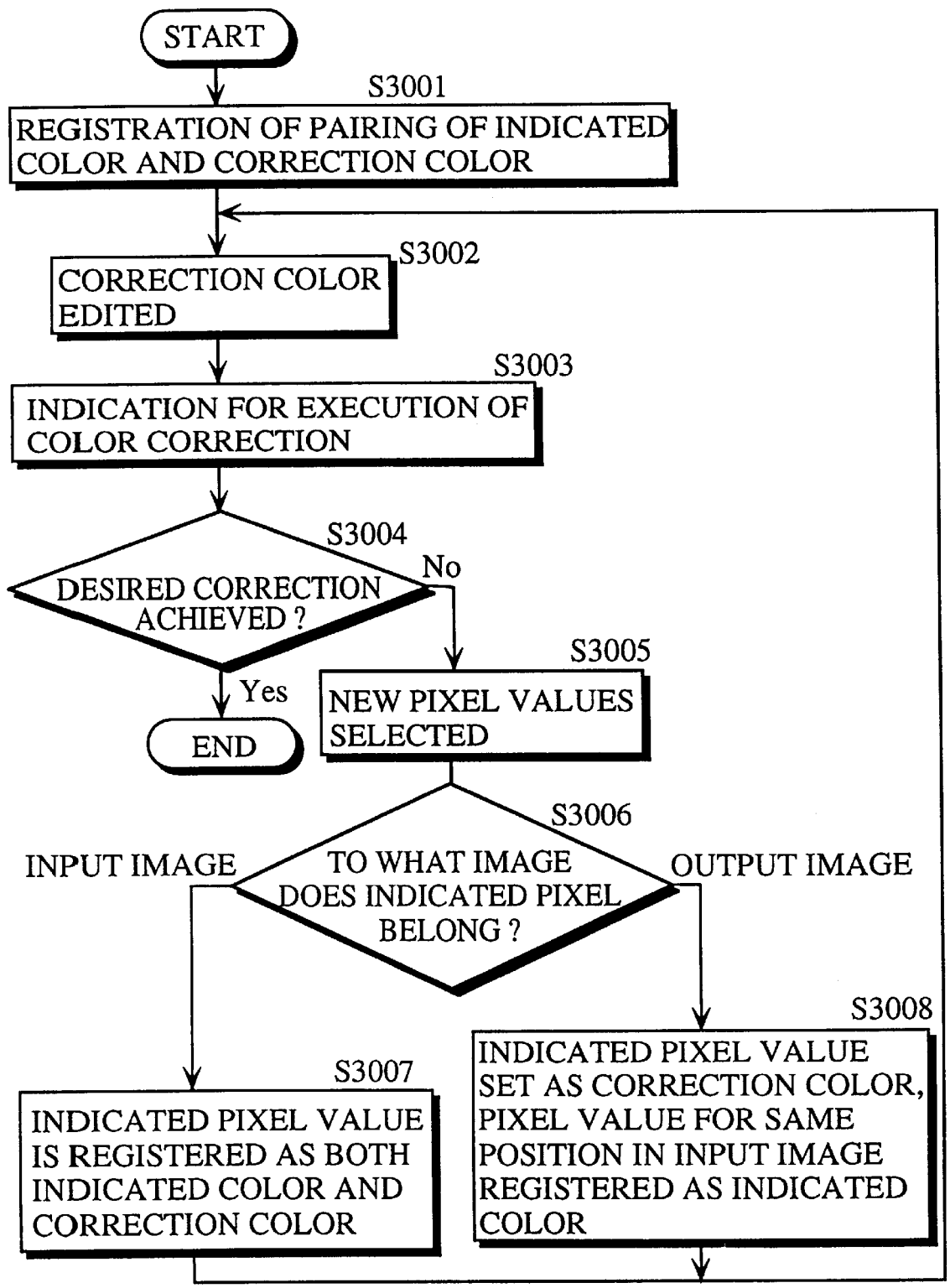
FIG. 30 is a flowchart showing the operation of the color correction device of the seventh embodiment of the present invention.

The following is an explanation of the operational procedure of the color indication unit, but for ease of understanding, this will be explained in terms of the flow of the operations made by the user. FIG. 30 is a flowchart which shows the operation of the present embodiment focusing on the user operations.

Firstly, the user has the indicated color, selected out of the inputted image displayed by the input/output image display unit 2901 by means of an operation of the mouse or other such pointing device, registered with a correction color as a pairing, with this then being displayed by the indicated color/correction color correction unit 2902 (Step S3001).

Since editing of the correction color is not necessary when the indicated color and correction color are set as a same color, a following pairing of indicated color and correction color are then registered. The plurality of registered pairings of indicated color and correction color are then arranged in a same sub-window in the indicated color/correction color correction unit 2902. If there are too many pairings of indicated color and correction color to be set into the same sub-window, then a scroll bar displayed to the side of the sub-window can be used to scroll its content horizontally.

When, for the pairing of registered indicated color and correction color, the user wishes to set a color different to the indicated color and correction color, color conversion of the correction color is performed (Step S3002). First, a pairing of indicated color and correction color displayed in the sub-window of the indicated color/correction color correction unit 2902 is selected by means of the pointing device, such as a mouse, as the pairing for which the correction color is to be converted. The display of the sub-window then changes so as to highlight that this pairing has been selected for color conversion.

Next, the sliders of the correction color editing unit 2903 are set so as to display the current values of the correction color to be converted. Here, by using the pointing device, such as a mouse, the user can move the sliders and thereby change the values of the correction color. The correction color having the current values set by the sliders in the correction color editing unit 2903 is shown in the display of the indicated color/correction color correction unit 2902.

Once the user has completed the registration of the necessary indicated colors and correction colors in order to obtain a desired color correction, the user then makes an indication by means of an appropriate operation button to have color correction activated (Step S3003). The display of the input/output image display unit 2901 then changes from displaying the input image to displaying the output image which has been color corrected. If the output image coincides with the user's desired image (Step S3004), then the user can terminate the color correction procedure by means of an appropriate operation button. Otherwise, when the parameters are adjusted and correction is repeated, the operation described below is performed for the pairing of indicated color and correction color (Steps S3005 to S3008).

After color correction has be performed at least once, the input/output image display unit 2901 displays the output image after such initial color correction, with the display in the same window switching between the input image and corresponding output image. Here, a new pairing of indicated color and correction color can be registered by means of a selection of a pixel in either of the images by the pointing device, such as a mouse (Step S3005). Here, when a pixel in the displayed input image is selected, the pixel values of the selected pixel are registered as both the indicated color and the correction color (Steps S3006, S3007), while when a pixel in the displayed output image is selected, the pixel values of the selected pixel are registered as the correction color and the values of the pixel in a same position in the input image are registered as the indicated color (Steps S3006, S3008). Following this, the procedure described above (Steps S3002 to S3008) is repeated until the desired color correction has been performed.

Also, by means of an appropriate button operation, the user can delete a registered pairing of indicated color and correction color, or return the correction color to be converted back to the same color as the indication color, or other make other such operations.

By including a color indication unit such as described above, then, by means of a simple operation, the user can have a desired color correction performed. That is to say, since the user can interactively indicate the necessary parameters for color correction by looking at the screens displayed in the same window, then there is the effect of that color correction can be performed using a simple, uniform operation.

Since the input image and output image are displayed alternately in the same window, then it is very easy for the user to verify the changes between the input and output images and therefore indicate precisely the pairing of indicated color and correction color.

When the indicated color and correction color are obtained through pixel selection in the input image, the registered indicated color and correction color are set as the same color, while when the selected indicated color and correction color are obtained through pixel selection in the output image, different values are obtained reflecting the last color correction to be performed. By doing so, it is possible for the user to use a method setting colors which are not to be changed by color correction by selecting colors in the input image and finely adjusting the image after color correction by setting colors in the output image, so that the user can easily indicate the indicated colors and correction colors which reflect the intended correction.

Also, by arranging the indicated color and correction color in a same sub-window, when there is a plurality of registered pairings of indicated color and correction color, then the other parts of the procedure can be performed without a reduction in the usable area of the display device.

Also, by setting a correction color in a pairing, selected out of all of the pairings of indicated color and correction color in the sub-window, as a color to be converted, then there can be ample space to display the correction color editing unit 2903, so that the display of such makes its operation easy.

It should be noted here that a same window for the input/output image display unit 2901 was used for alternately displaying the input image and the output image, although it is possible for the window to be subdivided and the input image and the output image displayed simultaneously. By doing so, the input image and output image can be visually compared simultaneously, facilitating precise correction of the colors.

It was also described how the conversion of the correction color by the correction color editing unit 2903 was achieved by operation of sliders, although this may otherwise be achieved by picking up a displayed sample color (not illustrated in FIG. 29), by a numerical input, or by a combination of said techniques. As a result, it is possible to attain color conversion which is as simple and as flexible as the user demands. For example, the brightness of the color of the sky may be adjusted using a slider, the color of cosmetics, such as lipstick, may be changed using a sample color chart for a commercial product, and the color of characters imposed on the image may be changed using numerical values determined beforehand with consideration to the characteristics of the display device, so that there is great flexibility in the way in which the device may be used.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A color correction device for correcting colors in a color image, comprising:

standard point registration means for registering coordinates in a color space of at least one standard point, the color space having axes for specifying colors and a standard point representing a color to be used as a standard for color correction;

object point registration means for registering coordinates in the color space of an object point for each standard point, each object point representing a desired color to be achieved by color correction of a standard point; and correction standard indication means for receiving an indication of at least two pairs of a standard point and an object point that are arbitrary points in the color space, and for registering standard points and object points of at least two pairs in the standard point registration means and the object registration means respectively; and coordinate conversion means for determining a single mapping function which simultaneously maps all of the standard points registered in the standard point registration means to respective corresponding object points registered in the object point registration means and which can be used for mapping any arbitrary point in the color space, and for generating a corrected color image from an inputted pre-correction image using the mapping function.

2. The color correction device of claim 1, wherein the mapping function is a function where an effect of a standard point on an amount which an arbitrary point in the pre-correction image is moved during mapping decreases as a distance in the color space from said pre-correction point to said standard point increases.

3. The color correction device of claim 2, wherein the coordinate conversion means includes:

standard movement amount calculation means for calculating a standard movement amount for each standard point, said standard movement amount being a standard value used in determining an amount which a point in the pre-correction image is moved during mapping;

first weighting coefficient calculation means for calculating a weighting coefficient which corresponds to a distance from a standard point to a pre-correction point, using a fixed weighting coefficient function which has the weighting coefficient decrease uniformly with said distance;

summing means for summing products of a standard movement amount and the weighting coefficient, for every standard point; and color image generation means for adding a value calculated by the summing means to the coordinates of the pre-correction point so as to generate a color in a corrected image.

4. The color correction device of claim 3, wherein the standard movement amount calculation means includes:

correction amount calculation means for calculating a difference (hereinafter, correction amount) in the coordinates between a standard point and a corresponding object point, for every standard point;

distance calculation means for calculating a distance between all possible combinations of two standard points, including combinations where there is duplication of a same standard point;

second weighting coefficient calculation means for using the weighting coefficient function to calculate a weighting coefficient for each distance calculated by the distance calculation means;

inverse matrix generation means for generating an inverse matrix of a matrix, wherein weighting coefficients calculated by the second weighting coefficient calculation means are elements in said matrix; and matrix multiplication means for multiplying the inverse matrix generated by the inverse matrix generation means by the correction amounts and for setting multiplication results as the standard movement amount, wherein there is a plurality of standard points.

5. The color correction device of claim 1, wherein the mapping function is a function which performs interpolation and extrapolation for any arbitrary point in the color space setting all of the standard points and object points as standards.

6. The color correction device of claim 5, wherein the coordinate conversion means includes:

distance determination means for comparing a distance on the color space between two standard points with a fixed threshold value; and calculation order determination means for determining object points to be simultaneously used when executing interpolation and extrapolation, based on a comparison result for the distance determination means.

7. The color correction device of claim 1, wherein the coordinate conversion means includes:

LUT storage means for storing a look up table (hereinafter, LUT) made up corresponding sets of coordinates for a plurality of predetermined points in the color space and coordinates of points achieved by mapping said points using the mapping function; and LUT reference means for retrieving, once a pre-correction color image has been inputted, post-correction points corresponding to pre-correction points in the color image.

8. The color correction device of claim 7, wherein the LUT reference means generates a corrected color image by retrieving a predetermined number of points in the LUT and executing an interpolation calculation between said points.

9. The color correction device of claim 1, wherein the coordinate conversion means includes:

temporary storage means for storing coordinates obtained by conversion using the mapping function corresponded to points before conversion;

hit detection means for detecting, once a pre-correction color image is inputted, whether pre-correction points in the pre-correction color image are being stored by the temporary storage means;

temporary storage retrieval means for retrieving, when the hit detection means detects that the pre-correction points are being stored, converted points corresponding to the pre-conversion points from the temporary storage means, thereby generating the corrected color image; and temporary storage writing means for writing, when the hit detection means detects that the pre-correction points are not being stored, points which are converted according to the mapping function and corresponding pre-conversion points into the temporary storage means, as well as generating the points of the corrected color image from the points which are converted.

10. The color correction device of claim 9, wherein the coordinate conversion means further includes:

temporary storage updating means for detecting whether there is free space for storing in the temporary storage means and, when a detection result is that there is no space for storing, for ensuring there is sufficient space for the temporary storage writing means to write by deleting a content at an appropriate position in the temporary storage means.

11. The color correction device of claim 10, wherein the temporary storage means stores coordinates of post-conversion points at blocks corresponded to coordinates of pre-conversion points, and the hit detection means detects whether a pre-conversion point is stored by the temporary storage means using the blocks.

12. The color correction device of claim 1, wherein the correction standard indication means includes:

display means;

input operation means for receiving an indication from the user; and display control means for displaying an operation image on the display means, for determining the standard point and the object point based on an indication received via the input operation means, and for storing the standard point in the standard point registration means and the object point in the object point registration means.

13. The color correction device of claim 12, wherein the display control means includes:

image display means for displaying the pre-correction color image and the corrected color image on the display means; and storage means for obtaining, when a pixel in the pre-correction color image is indicated by the input operation means, coordinates of said pixel as the standard point and an object point, for obtaining, when a pixel in the corrected color image is indicated by the input operation means, coordinates of said pixel as an object point, and coordinates of a pixel in a corresponding position in the pre-correction color image as the standard point, and for storing the standard point in the standard point registration means and the object point in the object point registration means.

14. The color correction device of claim 12, wherein the display control means includes correction standard display means for displaying every pairing of standard point and object point indicated by the input indication means arranged into a same window on the display means.

15. The color correction device of claim 14, wherein the display control means includes object point conversion means for setting, once a pairing of standard point and object point displayed in the same window have been selected by means of the input indication means, the object point in the pairing to be edited, and obtaining a newly indicated object point as a valid object point.

16. The color correction device of claim 15, wherein the object point conversion means displays at least one of sliders, sample colors, and numerical values in order to correct values of the object point in each axis of the color space and receives an editing based on an indication by the input indication means.

17. A color correction method for correcting colors in a color image, comprising:

a standard point registration step for registering coordinates in a color space of at least one standard point, the color space having axes for specifying colors and a standard point representing a color to be used as a standard for color correction;

an object point registration step for registering coordinates in the color space of an object point for each standard point, each object point representing a desired color to be achieved by color correction of a standard point;

a correction standard indication step for receiving an indication of at least two pairs of a standard point and an object point that are arbitrary points in the color space, and for registering standard points and object points of at least two pairs in the standard point registration means and the object point registration means respectively; and a coordinate conversion step for determining a single mapping function which simultaneously maps all of the standard points registered in the standard point registration means to respective corresponding object points registered in the object point registration means and which can be used for mapping any arbitrary point in the color space, and for generating a corrected color image from an inputted pre-correction image using the mapping function.

18. The color correction method of claim 17, wherein the mapping function is a function where an effect of a standard point on an amount which an arbitrary point in the pre-correction image is moved during mapping decreases as a distance in the color space from said pre-correction point to said standard point increases.

19. The color correction method of claim 18, wherein the coordinate conversion step includes:
   a standard movement amount calculation step for calculating a standard movement amount for each standard point, said standard movement amount being a standard value used in determining an amount which a point in the pre-correction image is moved during mapping;
   a first weighting coefficient calculation step for calculating a weighting coefficient which corresponds to a distance from a standard point to a pre-correction point, using a fixed weighting coefficient function which has the weighting coefficient decrease uniformly with said distance;
   a summing step for summing products of a standard movement amount and the weighting coefficient, for every standard point; and
   a color image generation step for adding a value calculated by the summing step to the coordinates of the pre-correction point so as to generate a color in a corrected image.

20. The color correction method of claim 19, wherein the standard movement amount calculation step includes:
   a correction amount calculation step for calculating a difference (hereinafter, correction amount in the coordinates between a standard point and a corresponding object point, for every standard point;
   a distance calculation step for calculating a distance between all possible combinations of two standard points, including combinations where there is duplication of a same standard point;
   a second weighting coefficient calculation step for using the weighting coefficient function to calculate a weighting coefficient for each distance calculated by the distance calculation step;
   an inverse matrix generation step for generating an inverse matrix of a matrix, wherein weighting coefficients calculated by the second weighting coefficient calculation step are elements in said matrix; and
   a matrix multiplication step for multiplying the inverse matrix generated by the inverse matrix generation step by the correction amounts and for setting multiplication results as the standard movement amount,
   wherein there is a plurality of standard points.

21. The color correction method of claim 17, wherein the mapping function is a function which performs interpolation and extrapolation for any arbitrary point in the color space setting all of the standard points and object points as standards.

22. The color correction method of claim 21, wherein the coordinate conversion step includes:
   a distance determination step for comparing a distance on the color space between two standard points with a fixed threshold value; and
   a calculation order determination step for determining object points to be simultaneously used when executing interpolation and extrapolation, based on a comparison result for the distance determination step.

23. The color correction method of claim 17, wherein the coordinate conversion step includes:
   an LUT storage step for storing a look up table (hereinafter, LUT) made up corresponding sets of coordinates for a plurality of predetermined points in the color space and coordinates of points achieved by mapping said points using the mapping function; and
   an LUT reference step for retrieving, once a pre-correction color image has been inputted, post-correction points corresponding to pre-correction points in the color image.

24. The color correction method of claim 23, wherein the LUT reference step generates a corrected color image by retrieving a predetermined number of points in the LUT and executing an interpolation calculation between said points.

25. The color correction method of claim 17, wherein the coordinate conversion step includes:
   a temporary storage step for storing coordinates obtained by conversion using the mapping function corresponded to points before conversion;
   a hit detection step for detecting, once a pre-correction color image is inputted, whether pre-correction points in the pre-correction color image are being stored by the temporary storage step;
   a temporary storage retrieval step for retrieving, when the hit detection step detects that the pre-correction points are being stored, converted points corresponding to the pre-conversion points from the temporary storage step, thereby generating the corrected color image; and
   temporary storage writing step for writing, when the hit detection step detects that the pre-correction points are not being stored, points which are converted according to the mapping function and corresponding pre-conversion points into the temporary storage step, as well as generating the points of the corrected color image from the points which are converted.

26. The color correction method of claim 25, wherein the coordinate conversion step further includes:
   a temporary storage updating step for detecting whether there is free space for storing in the temporary storage step and, when a detection result is that there is no space for storing, for ensuring there is sufficient space for the temporary storage writing step to write by deleting a content at an appropriate position in the temporary storage step.

27. The color correction method of claim 26, wherein the temporary storage step stores coordinates of post-conversion points at blocks corresponded to coordinates of pre-conversion points, and the hit detection step detects whether a pre-conversion point is stored by the temporary storage step using the blocks.

28. The color correction method of claim 17, wherein the correction standard indication step includes:
   a display step;
   an input operation step for receiving an indication from the user; and
   a display control step for displaying an operation image on the display step, for determining the standard point and the object point based on an indication received via the input operation step, and for storing the standard point in the standard point registration step and the object point in the object point registration step.

29. The color correction method of claim 28, wherein the display control step includes:
   an image display step for displaying the pre-correction color image and the corrected color image on the display step; and a storage step for obtaining, when a pixel in the pre-correction color image is indicated by the input operation step, coordinates of said pixel as the standard point and an object point, for obtaining, when a pixel in the corrected color image is indicated by the input operation step, coordinates of said pixel as an object point, and coordinates of a pixel in a corresponding position in the pre-correction color image as the standard point, and for storing the standard point in the standard point registration step and the object point in the object point registration step.

30. The color correction method of claim 28, wherein the display control step includes correction standard display step for displaying every pairing of standard point and object point indicated by the input indication step arranged into a same window on the display step.

31. The color correction method of claim 30, wherein the display control step includes object point conversion step for setting, once a pairing of standard point and object point displayed in the same window have been selected by step of the input indication step, the object point in the pairing to be edited, and obtaining a newly indicated object point as a valid object point.

32. The color correction method of claim 31, wherein the object point conversion step displays at least one of sliders, sample colors, and numerical values in order to correct values of the object point in each axis of the color space and receives an editing based on an indication by the input indication step.

* * * * *